(12) United States Patent
Matsuo

(10) Patent No.: US 8,737,617 B2
(45) Date of Patent: May 27, 2014

(54) ENCRYPTION APPARATUS, DECRYPTION APPARATUS, ENCRYPTION METHOD, DECRYPTION METHOD, AND ENCRYPTION/DECRYPTION SYSTEM

(75) Inventor: Masakatsu Matsuo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 24 days.

(21) Appl. No.: 13/498,441

(22) PCT Filed: Sep. 29, 2010

(86) PCT No.: PCT/JP2010/005876
§ 371 (c)(1),
(2), (4) Date: Mar. 27, 2012

(87) PCT Pub. No.: WO2011/040023
PCT Pub. Date: Apr. 7, 2011

(65) Prior Publication Data
US 2012/0183139 A1    Jul. 19, 2012

(30) Foreign Application Priority Data

Sep. 29, 2009  (JP) ................................. 2009-223991

(51) Int. Cl.
| H04L 9/00 | (2006.01) |
|---|---|
| H04L 9/32 | (2006.01) |
| H04K 1/00 | (2006.01) |
| H04L 9/30 | (2006.01) |
| H04L 9/08 | (2006.01) |
| G06F 21/20 | (2006.01) |
| G06F 15/00 | (2006.01) |

(52) U.S. Cl.
USPC ................. 380/255; 380/28; 380/30; 380/44; 713/171; 726/7

(58) Field of Classification Search
USPC ........................ 380/255, 28, 30, 44; 713/171
See application file for complete search history.

(56) References Cited

U.S. PATENT DOCUMENTS 5,241,599 A * 8/1993 Bellovin et al. ............... 713/171
2009/0153899 A1   6/2009 Shimizu

FOREIGN PATENT DOCUMENTS

| JP | 10-224340 | 8/1998 |
|---|---|---|
| JP | 2000-349748 | 12/2000 |

(Continued)

OTHER PUBLICATIONS

Tianjie Cao ; Dongdai Lin; "Cryptanalysis of two password authenticated key exchange protocols based on RSA"; Communications Letters, IEEE vol. 10 , Issue: 8 Digital Object Identifier: 10.1109/LCOMM.2006.1665131 Publication Year: Aug. 2006 , pp. 623-625.*
M. Takano, "Chained Stream Cipher using Sequential Machines," IEICE Technical Report, vol. 94, No. 559, Apr. 10, 1995, 12 pages total.

(Continued)

*Primary Examiner* — Andrew Nalven
*Assistant Examiner* — Courtney Fields
(74) *Attorney, Agent, or Firm* — Dickinson Wright PLLC

(57) ABSTRACT

In order to protect SSL encrypted communication from MITM attacks, a server certificate is used in the communication. However, operation of the server certificate is not simple, and the certificate is not sufficient to protect the communication from the MITM attacks. In SSL encrypted communication in which a password is shared between a client and a server, the client encrypts random number data and a password by means of a public key, determines a value by processing encrypted data by means of encrypted password data, and transfers the thus-determined value to the server. The server eliminates the password encrypted data from the value and back calculates the random number data, which are then decrypted, to thus acquire the random number data generated by the client. A hash value of the random number data is submitted to the client.

11 Claims, 11 Drawing Sheets

(56) References Cited

FOREIGN PATENT DOCUMENTS

| | | | |
|---|---|---|---|
| JP | 2003-223435 | | 8/2003 |
| JP | 2005-216029 | | 8/2005 |
| JP | 2007-286663 | | 11/2007 |
| JP | 2009-147655 | | 7/2009 |
| JP | 2012247858 A | * | 12/2012 |

OTHER PUBLICATIONS

S. Bellovin, et al., "Encrypted Key Exchange: Password-Based Protcols Secure Against Dictionary Attacks," In proc. IEEE Computer Society Symposium on Reserach in Securtiy and Privacy, 1992, pp. 72-84, p. 3, Line 5.

International Search Report dated Oct. 26, 2010.

* cited by examiner

ENCRYPTION APPARATUS, DECRYPTION APPARATUS, ENCRYPTION METHOD, DECRYPTION METHOD, AND ENCRYPTION/DECRYPTION SYSTEM

TECHNICAL FIELD

The present invention relates to an encryption apparatus, a decryption apparatus, an encryption method, a decryption method, and an encryption/decryption system that safely establish a communication between two points.

BACKGROUND ART

In relation to communications carried out by way of the Internet, there is recently an increase in the number of threats from man-in-the-middle (MITM) attacks, such as phishing, safe communications have become hardly performed by means of only encrypted communications, so that a desire exists for countermeasures against the MITM attacks.

One of the related-art methods for safely performing communications is an SSL encrypted communication. Further, a mechanism for lessening attacks from MITM has already been built in the SSL encrypted communication. In the SSL encrypted communication, there has been employed a method for determining whether a communication is established with an authorized other party by checking a server certificate.

However, since the server certificate is visually checked in principle, it involves consumption of much time and effort. Further, if a server certificate similar to a genuine server certificate is available for the MITM, difficulty will be met in determining whether the server certificate is a fake. In order to solve the problem, an ordinary HTTP browser automatically displays a warning when a server certificate has a problem. However, the automatic check includes only a check as to whether or not a server certificate has previously been certified by a registered certification authority and whether or not problems exist in the form of a server certificate, such as an expiry date or a digital signature. If the MITM has a formally authorized server certificate or if the MITM has registered its server certificate in an HTTP browser in such a way that the browser trusts the certificate by utilization of virus software, or the like, the server certificate will not make any effects.

In order to augment the automatic check, greatly enhanced server certificates called EV certificates have recently come along. However, the EV certificates make it difficult, in some degree, to make attacks, but the essential problem still remains unsolved.

Further, as the server certificates are augmented, greater expenses are consumed, which poses difficulty in public use of server certificates.

As has been mentioned above, truly effective, inexpensive measures for preventing MITM attacks have never been realized, in connection with encrypted communication established between two points that are unknown to each other.

Against the backdrop, whether or not it is possible to prevent MITM attacks even solely in a period during which two points share secret information, such as a password, has naturally cropped out as a topic. Although being subject to such a constraint, the topic is still significant.

In the Internet communication in which a user is identified by a password; for instance, online banking or viewing of network cameras, the user is granted a right to exercise its own right; hence, the communication is attractive for attackers to make attacks. Conversely, when communicating parties are indefinite, a value of information is low, which is less attractive for attackers to make attacks. Accordingly, if MITM attacks can be prevented even solely in a period during which a password is shared between two points, protection is very significant from the viewpoint of the extent of damage.

If a password whose bit length is long to such an extent that it is cryptographically determined to be safe is secretly held between two points, encrypted communication can be safely implemented by utilizing the password as a common key. However, it is difficult for ordinary persons to memorize the password.

Accordingly, it has been expected to be able to prevent MITM attacks by use of a password a person can memorize; namely, secret information whose bit length is not long to such an extent that it is cryptographically determined to be safe.

EKE (Encrypted Key Exchange) has hitherto been known as such a method (see Non-Patent Literature 1).

CITATION LIST

Non-Patent Literature

Non-Patent Literature 1: S. Bellovin and M. Merritt, Encrypted key exchange: Password-based protocols secure against dictionary attacks. In proc. IEEE Computer Society Symposium on Research in Security and Privacy, pp. 72-84 (1992).

SUMMARY OF INVENTION

Technical Problem

However, some kinds of attacking methods already exist in connection with the related art method, and the method cannot be said to be safe.

SSL (Secure Sockets Layer) encrypted communication using RSA (Rivest-Shamir-Adleman Scheme) as a public key encryption technique is most popular as encrypted communication utilized by a common user and has achieved widespread use.

Accordingly, there has been desired safe protection against MITM attacks by use of a password suitable for SSL encrypted communication of RSA public-key cryptography type.

The present invention has been contrived to solve the problems of the related art and primarily intended for providing an encryption apparatus, a decryption apparatus, an encryption method, a decryption method, and an encryption/decryption system that lessen damages from MITM attacks by use of a password when SSL encrypted communication, public key encryption, or the like, is utilized.

Solution to Problem

In order to solve the problems, a first invention of the present patent application provides an encryption apparatus including: a receiving unit that receives a first public key from a decryption apparatus; an encryption unit that calculates a residue by means of taking dividend data including at least a portion of a password as a dividend and the first public key as a divisor; and a transmitting unit that transmits the residue as encrypted data to the decryption apparatus, wherein the encryption unit adds or subtracts at least a portion of the password as the dividend data to or from a predetermined value.

Advantageous Effects of Invention

As mentioned above, according to the present invention, dividend data are generated by shifting at least a portion of a password from a predetermined value. Hence, even when an attacker looks into a password in a round-robin way, it is not possible to easily narrow down password candidates. Thereby, information can safely be transmitted without concern for attacks from third parties.

MODES FOR CARRYING OUT INVENTION

Embodiments of the present invention are hereunder described by reference to the drawings.

First Embodiment

Figure 1:
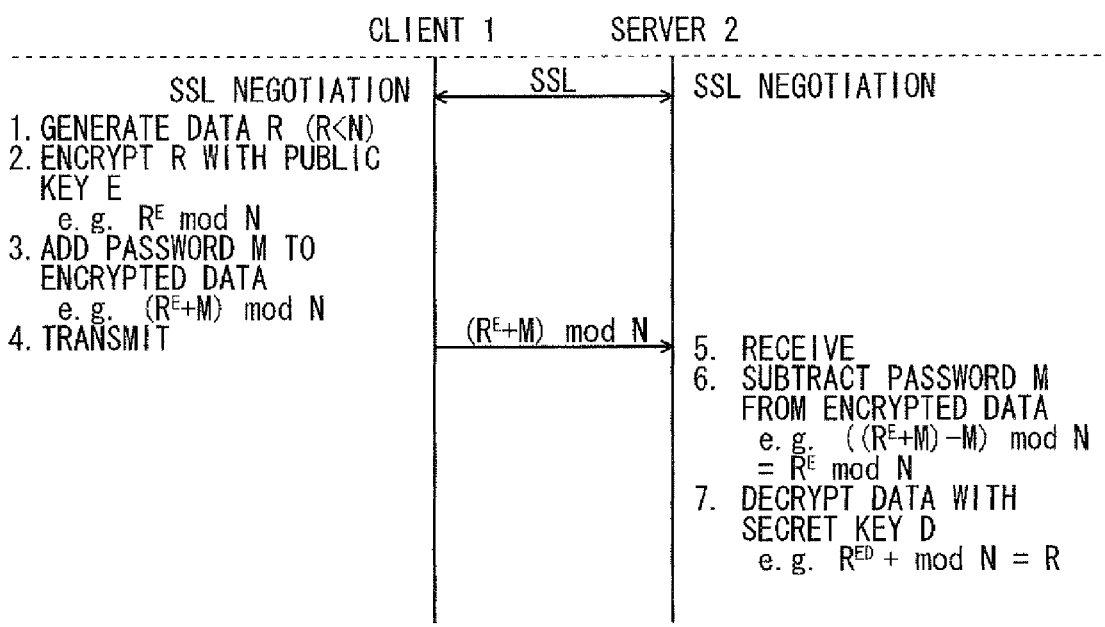
FIG. 1 is a diagram showing data exchange procedures of a first embodiment of the present invention.

FIG. 1 is a diagram showing data exchange procedures of a first embodiment of the present invention. In the first embodiment, a client encrypts secret data R desired to be sent to a server by means of a public key, generates data resultant from the encrypted data shifted by a password, and transmits the thus-generated data, thereby implementing safe, secret communication that is tolerant to MITM attacks. The client is an example encryption apparatus, and the server is an example decryption apparatus. An encryption/decryption system is built from the client and the server.

In drawings following FIG. 1, a public key encryption technique is described by means of an example case where an RSA public-key cryptography technique is utilized.

There are conducted ordinary SSL negotiations between the client and the server. A public key E (an exponent) and a public key N (a modulus) of the server are transferred to the client at this point in time. In order to simplify explanations, SSL negotiations are supposed to be performed. However, transfer of the public keys is not limited to the SSL encrypted communication and can also be conducted even by E-mail or hand. Any means can be used for transfer of the public keys. The same is true of the other drawings and its explanation is hence omitted here for brevity.

An SSL server should not be mistaken as the server referred to in the present invention. If an SSL client owns a pair of a public key and a secret key, the SSL server can transmit data R to the SSL client by use of the pairs of keys according to the procedures described in connection with the first embodiment. In this case, a relationship between the SSL client and the SSL server achieved through SSL negotiations becomes opposite to a relationship between the client and the server shown in FIG. 1. For instance, the public key and the secret key transferred to the server by means of authentication of the client performed during SSL negotiations can be utilized. In this case, the SSL server corresponds to the client in FIG. 1, whilst the SSL client corresponds to the server shown in FIG. 1. The same is also true of corresponding procedures in the other embodiments, and its explanation is omitted from the other drawings.

1: The client generates secret data R desired to be transmitted to the server as shown in FIG. 1. A bit length of the secret data R is preferably long to such an extent that the data are cryptographically determined to be safe, so as not to be subject to online attacks. 2: The data R are encrypted by means of a public key, to thus determine $[R^E \bmod N]$. 3: A password M is added to $[R^E \bmod N]$, thereby determining $[(R^E+M) \bmod N]$ that is a residue of the modulus N. Although the password M is added, the password may be subtracted. Specifically, dividend data $(R^E+M)$ including the password M are taken as a dividend. The public key N of the public keys E and N is taken as a divisor, thereby calculating a residue $((R^E+M) \bmod N)$. In this case, a password M is added to $R^E$ in the dividend data $(R^E+M)$. The dividend data do not always need to include the entire password M and can include a portion of the password M.

If the password M is added or subtracted, special offline attacks, such as password guessing attacks, as well as online attacks and ordinary offline attacks can also be prevented. In order to prevent online attacks, the password M should avoid assuming an extremely short bit length. 4: $[(R^E+M) \bmod N]$ is then transmitted to the server.

In relation to all of the drawings including FIG. 1, all of the expressions can assume a value having an addition of a multiple of the modulus N. For instance, in the case of $[R^E \bmod N]$, $[(R^E+XN) \bmod N]$ (X=1, 2, . . . ) can also be available.

In the meantime, 5: the server receives $[(R^E+M) \bmod N]$ from the client in FIG. 1. 6: The password M is subtracted from $[(R^E+M) \bmod N]$ (the password M is added when the client has subtracted the password from the dividend), thereby determining $[R^E \bmod N]$ that is a residue of the modulus N. 7: $[R^E \bmod N]$ is decrypted by use of a secret key D and the public key N owned by the server, to thus determine the data R.

Even when an attacker can have acted as the server, $[R^E \bmod N]$ cannot be calculated from $[(R^E+M) \bmod N]$ because the attacker does not know the password M.

When the data R transmitted from the client to the server are meaningful data, such as a command, the attacker may act as a server, to thus receive the data from the client and make round-robin attacks (offline attacks) to the password M to check whether or not meaningful data appear. In order to avoid the attack, it is better for the client to set a value M' that is not an authorized password, thereby calculating $[(R^E+M') \bmod N]$ and send the thus-calculated result to the server. If the server processes the result along the same procedures, meaningless data R' will be produced. However, the server can discard the meaningless data.

If such dummy communication is carried out many times and authorized communication is mixed in the dummy communications, the attacker will become difficult to make offline attacks to the legitimate communication. The present invention is something like taking calculation of a residue as a wave having an N-modulus period and subjecting the wave to phase modulation through use of the password M. This means that meaningful data are communicated while being superimposed on each of phases. The communication makes it difficult for a wiretapper to know a phase by means of which an authorized client and an authorized server are in communication. This is also true of FIG. 2 to be described below.

The way how the server specifies the password M of the client is not described. For instance, as in the case of ordinary authorization of a password, the client transmits an ID that specifies the password M, thereby specifying the password. In addition, it is also possible to store the password M in association with information about a destination of communication of the client. This is also true of the other drawings, and its explanation is omitted in connection with the other drawings.

The "public key cryptosystem for enabling decryption of data, which have been encrypted by one party by use of only a public key, by use of the public key and a secret key that pairs up with the public key" refers to; for instance, RSA public-key cryptography, El-Gamal encryption, and the like.

Even in RSA public-key cryptography or El-Gamal encryption, there are cases where only one party keeps a secret key and where both parties keep respective different secret keys of different key pairs, each of which consists of a public key and a secret key (a public key pairing up with a secret key of one key pair is transferred from one party to the other party, and a public key pairing up with a secret key of the other key pair is transferred from the other party to the one party). Attention must be paid to the fact that the embodiment is not subject to a limitation "only one party keeps a secret key."

The public key referred to herein includes public information. For instance, in RSA public-key cryptography, the modulus (N) assumes a different value according to a server. Hence, the modulus is called a public key. However, since a value common to all servers can be utilized as a modulus of El-Gamal encryption, the modulus is called public information. In the present patent application, both of the moduli are given a unified designation "public key."

For convenience, the client referred to herein merely designates a party that uses only a public key in the public key encryption technique, and the server referred to herein designates a party that uses both the public key and the secret key. The client and the server can also be changed to designations such as Bob and Alice commonly used in the cryptography.

Attention must be paid to this regard in connection with all inventions of the present patent application. When SSL encrypted communication is in progress, the SSL server should not be mistaken as the server referred to herein. For instance, when an SSL client holds a pair that consists of a public key and a secret key and that is different from a pair of keys of an SSL server and when the SSL server transmits the data R to the SSL client by use of the public key of the SSL client along the procedures of the present invention, the SSL client corresponds to the server of the present invention. Accordingly, when the data R are encrypted by utilization of the public key of the other party, both parties can be called a server/client.

The server does not always hold therein the public key and the secret key. The server can also be configured in such a way that the public key and the secret key are held in an external device, such as an IC card connected to the server. Moreover, arithmetic processing using a secret key can also be performed by use of an external apparatus. Likewise, the public key of the client can also be taken as being kept in an external apparatus connected to the client, and arithmetic processing using a public key can also be taken as being performed by the external apparatus. In this case, a client/server configuration, including the external apparatus, is implemented. This is also true of all of the claims.

Accordingly, one person can connect an IC card retaining a public key and a secret key belonging to the person to a client, cause the client to transmit the data R to a server according to the procedures of the present invention, also go to a server and connect the same IC card to the server, and let the server acquire the data R according to the procedures of the present invention. Such an utilization method is available for a case where the server is a printer. If the same IC card retaining the public key and the secret key is connected to both the client and the server, the password would seem to be unnecessary. However, even when the IC card is connected, replacement of the authorized key with an unauthorized key would be caused by virus software. Therefore, the password is accordingly effective.

When public key encryption, such as SSL encrypted communication, is utilized, it becomes possible to safely transmit information between the authorized client and the authorized server by utilizing the scheme as it is and, in addition, without involvement of deterioration of performance and intervention of the MITM.

This is very beneficial for mail communications, too. Unlike S/MIME, the scheme makes it possible to readily prevent MITM attacks by exchanging a password beforehand without use of digital certificates.

Even if the attacker can conduct a communication with the authorized client while behaving as a server and can pass its own public key to the authorized client, the data generated by encrypting the data R by means of the public key encryption technique have been subjected to addition or subtraction of the password M. Hence, the attacker cannot correctly decrypt the encrypted data R without knowing the password M.

Since the attacker cannot behave like a server as mentioned above, the attacker cannot transfer its own public key to the authorized client while behaving like an authorized server and intervening between the authorized client and the authorized server and cannot make bucket brigade attacks on-line (i.e., online attacks) to the authorized server while behaving like an authorized client, either.

Further, even when the attacker has intervened between the authorized client and the authorized server to thereby let exchanged data simply go through to the client, MITM attacks will not work out. If this is a case, the public key of the authorized server will go to the authorized client. When the data R are encrypted by use of the public key, all attacks will become impossible from the viewpoint of safety of the public key cryptosystem.

Further, in contrast with EKE, the encryption scheme is also tolerant to offline attacks (hereinafter called "password guessing attacks") in which the attacker guesses a password, such as that will be described below.

In the case of $[MR^E \bmod N]$, the attacker can sniff online $[MR^E \bmod N]$ exchanged between the client and the server and make offline attacks, such as those mentioned below.

On the assumption that the data M including the password information would be $M_1, M_2, \ldots, [M_1^{-1}MR^E \bmod N]$, $[M_2^{-1}MR^E \bmod N], \ldots$, are computed with regard to the sniffed $[MR^E \bmod N]$. It is checked whether or not $[R^E \bmod N]$ assumes a value. If $[R^E \bmod N]$ does not assume any value, the presumed provisional password is incorrect, and hence the password is excluded from password candidates. If numbers of $[MR^E \bmod N]$ are collected and if Ms are examined in a round-robin manner, correct password candidates can considerably be narrowed down.

This will now be explained by reference to a specific example. For instance, N=15 is assumed to stand, and the client is assumed to have generated [$MR^E$ mod N]=1. It is now assumed that the attacker would have adopted M=3. Since [$R^E$ mod N] that lets an equation [$3 \times R^E$ mod 15]=1 stand is not present (even when [$R^E$ mod N]=1, 2, . . . , 14 are sequentially substituted into the equation, the equation does not stand), M=3 is understood to be an untrue password. However, the calculation is carried out in sequence of M=1, 2, . . . , password candidates can be narrowed down.

A bit length of a password usually holds a length that is enough to withstand online attacks. However, if the attacker has sufficiently narrowed down password candidates in advance by means of offline attacks, it will become easy to eventually determine which of the password candidates is correct by final online attacks.

The attack is effective not only for [$MR^E$ mod N] but also for a scheme determined by encrypting [$R^E$ mod N] while the data R are taken as a common key.

However, in the present invention, even if the attacker would assume the data M including the password information as $M_1$, $M_2$, . . . , by use of similar offline attacks and produce [$((R^E+M)-M_1)$ mod N], [$((R^E+M)-M_2)$ mod N], . . . , [$R^E$ mod N] will inevitably assume any value. Hence, the attacker cannot take any cue. Since it is extremely difficult to prevent the attacks by means of a related-art method, such as EKE, the present invention is highly effective.

When residue calculation is taken as a wave having a modulus-N period, EKE is much like subjecting a wave to amplitude modulation by means of data M. A contrast between the present invention and the related-art technique lies in that the wave is phase-modulated by the data M. Such a difference in technique yields an effect, such as that mentioned above.

The password itself can be utilized as the data M. However, if there is made any contrivance to mix the password with random number data exchanged between the client and the server or information unique to the client/server, such as address information, retry attacks, or the like, can also be prevented, which is desirable in view of security. Moreover, there is a risk of an attacker stealing a password directly from a server. Accordingly, it is better to utilize as M data that are generated by processing a password by means of a complicate function, such as a one-way function and to store the data M in the server.

When the password is subjected to data processing, each of the client and the server is presumed to finally assume a value that is a result of the data M having undergone the same calculation processing even if calculation processing will change in terms of; for instance, calculation sequence. This is also true of its counterpart descriptions of all of the inventions of the present patent application.

Although the way the server selects a password of interest from among passwords of large numbers of users is not clearly specified, the simplest method of doing it is to utilize an ID in the same way that it is commonly used for authenticating a password.

In all of the inventions of the present patent application, data exchanged between the client and the server can be exchanged after undergoing various data processing, such as common key encryption employed in SSL encrypted communication.

Although it applies to all of the inventions of the present patent application that a bit length of data R is very longer than a bit length of a password, using a password that is safe against online round-robin attacks is desirable.

There is a case where public key encryption/decryption means 1 and public key encryption/decryption means 2 are equivalent to each other as calculation means (a calculation formula). If the public key encryption technique is for instance, RSA public-key cryptography, the public key encryption/decryption means 1 corresponds to; for instance, means that calculates [$X^E$ mod N] from arbitrary data X, and the public key encryption/decryption means 2 corresponds to means that calculates [$X^D$ mod N] from the arbitrary data X. Although differing from each other in terms of an exponent value utilized in "power-residue calculation," both means are identical to each other in terms of calculation means (a calculation formula). This applies to all of the inventions of the present patent application.

"There is calculated a residue of a public key (preceding N of RSA public-key cryptography) that is a sum of encrypted data and the data M including information about at least a portion of a password (including data generated by processing a portion or the entirety of a password) or a residue (preceding N of RSA public-key cryptography) of a public key of difference (for instance, [$(R^E+M)$ mod N] or [$(R^E-M)$ mod R]) in RSA public-key cryptography)." The calculation can also be performed by any method of; for instance, [$(M-R^E)$ mod N]. When back calculating the data, all you have to do is to perform data processing so as to restore $R^E$ to a positive value by subtraction of the data M from the residue.

Further, "calculating a residue of the public key (preceding N of RSA public-key cryptography)" is not limited to a value that is less than a public key. Residue calculation may also be interrupted when a given bit length (a value that is larger than the public key) or less is achieved. This is also true of cases where the data R are encrypted. This also applies to all claims. In the case of RSA public-key cryptography, a public key corresponds to a preceding modulus N. However, in the case of El-Gamal encryption, the public key corresponds to P to be described below.

A method for utilizing the El-Gamal encryption is also provided for the sake of reference.

(1) A public key (which strictly means public information) for ordinary El-Gamal encryption is assumed to include P (a prime number) and G (a primitive element).

When the secret key is taken as X, the server employs A=[$G^X$ mod P] as a public key.

Random numbers prepared by the client are taken as V. The client transmits the following data to the server.

B=[$G^V$ mod P]

C=[$A^V R$ mod P] (R denotes plain text data)

The server performs the following calculation, to thus acquire a plain text.

R=[$C/B^X$ mod P]

(2) El-Gamal encryption of the present scheme

The public key (that strictly means public information) includes P (a prime number) and G (a primitive element).

The client transmits the following data to the server.

B'=[$(G^V+M)$ mod P]

C'=[$(A^V R+M)$ mod P]

The server performs the following calculation, to thus acquire a plain text.

R=[$(C'-M)/(B'-M)^X$ mod P], where one of B' and C' can also be replaced with either B or C.

Figure 2:
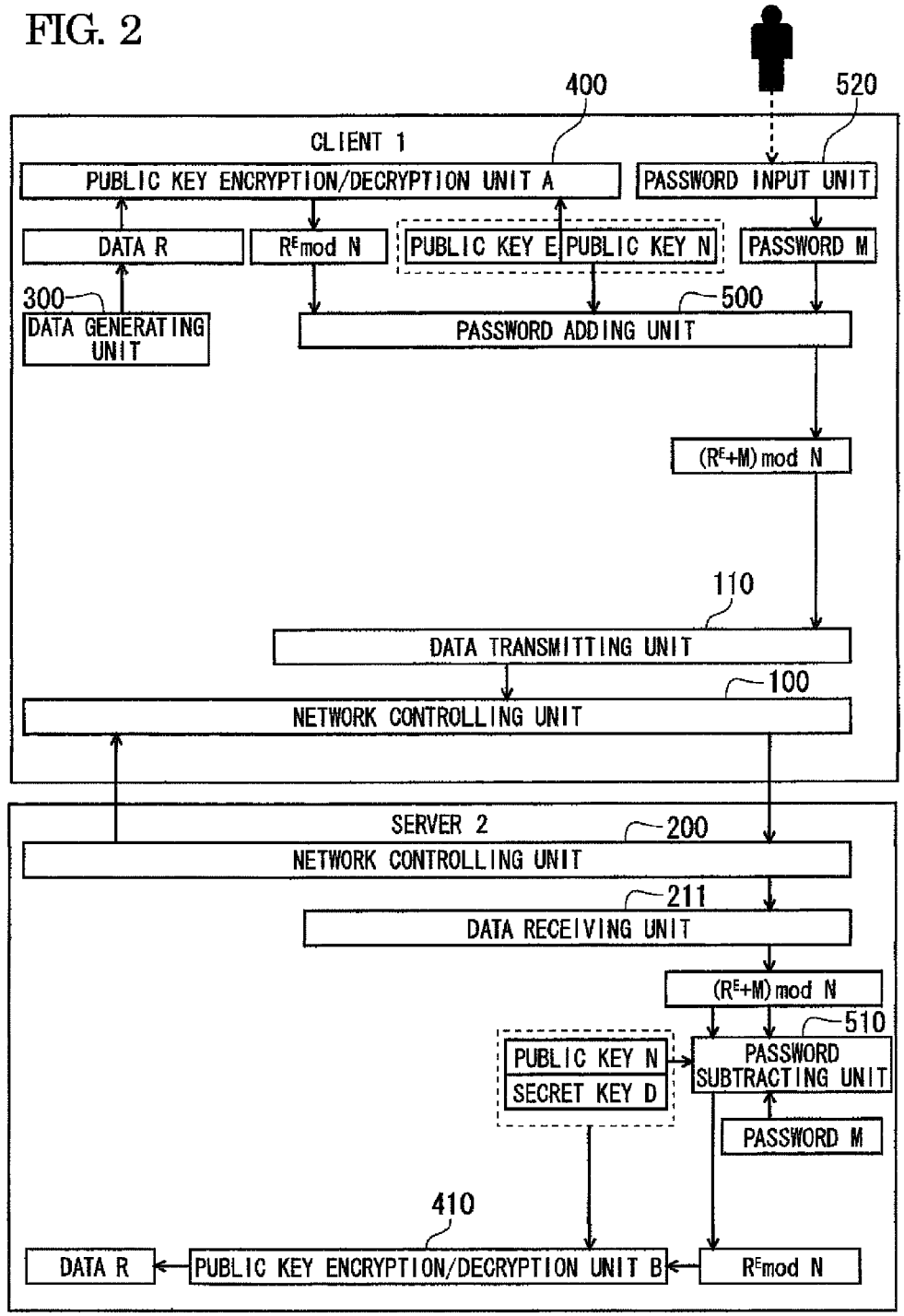
FIG. 2 is a block diagram of the first embodiment of the present invention.

FIG. 2 is a block diagram of the first embodiment of the present invention. A client 1 is configured so as to acquire the password M from the user by use of a password input unit 520 and establish a secret communication with a server 2 that previously stores and retains the password M.

The client 1 can also store and retain the password M in advance in the same way as does the server 2. Alternatively, the user may also input the password M of the server 2 in the case where the user goes to the server 2 to use it; for instance, the case where the server 2 is a printer, or in the case of a client-server conference system in which the user also uses a server-side terminal (the server-side user is different from a client-side user).

To begin with, the client 1 starts making a connection to the server 2, thereby conducting SSL negotiations. The public key E and the public key N of the server 2 are transferred to the client 1 at this point in time. As described in connection with FIG. 1, the client 1 does not always mean an SSL client, and the server 2 does not always mean an SSL server. During client authentication in the SSL negotiations, the SSL client sends the public key E and the public key N to an SSL server. When the thus-sent public keys are used, the client 1 corresponds to the SSL server, and the server 2 corresponds to the SSL client. This also applies to another block diagram, and the descriptions are omitted from descriptions of the other block diagrams.

Since a public key delivery method is irrelevant to the present invention, actual transfer of the public key can also be performed by another means other than the SSL negotiations. The public key can also be manually transferred. However, in order to simplify descriptions, SSL negotiations are supposed to be performed. Since the SSL negotiations are known techniques, procedures of the SSL negotiations are not described anew. Explanations are given to portions of the SSL negotiations that are relevant to the present invention. Specifically, a public key is transferred to the client 2 as a result of SSL negotiations, and explanations are also given on the premise of transfer of the public key. The same also applies to the corresponding descriptions in connection with other drawings. The explanations for the other drawings are therefore omitted.

The client 1 asks the user to enter a password before or after SSL negotiations by use of the password input unit 520.

The user inputs the password M by use of the password input unit 520.

A data generating unit 300 prepares secret data R desired to be transmitted to the server 2 asynchronously to SSL negotiations and the input of the password.

A public key encryption/decryption unit A 400 encrypts the data R by use of the public keys E and N, thereby calculating $[R^E \bmod N]$.

A password adding unit 500 next adds the password M to $[R^E \bmod N]$, thereby acquiring a residue of the modulus N; namely, $[(R^E M) \bmod N]$. So long as the password M is added as mentioned above, it will also become possible to protect the data from special offline attacks, such as "password guessing attacks," as well as from online attacks and ordinary offline attacks.

Reference symbol M does not necessarily mean a password as it also applies to FIG. 1. Reference symbol M can also be a value that is obtained by subjecting a password to data processing. In reality, subjecting the password to data processing by use of random number data exchanged between the client and the server or unique value information, such as address information, is desirable because it enhances a security level. The same also applies to the other drawings, and its explanation is omitted in connection with the other drawings.

A data transmitting unit 110 of the client 1 transmits $[(R^E+M) \bmod N]$ to the server 2 by way of a network controlling unit 100.

A data receiving unit 211 of the server 2 receives $[(R^E+M) \bmod N]$ by way of a network controlling unit 200.

A password subtracting unit 510 subtracts the password M from $[(R^E+M) \bmod N]$, thereby determining a residue of the modulus N; namely, $[R^E \bmod N]$.

In the case of $[(R^E+M) \bmod N] < M$, a result of the password M being subtracted from $[(R^E+M) \bmod N]$ becomes negative. Since the calculation is residue calculation, the result comes to a "positive" value when N (a multiple of N) is added to the residue.

A public key encryption/decryption unit B 410 decrypts $[R^E \bmod N]$ by use of the secret key D and the public key N owned by the server 2, thereby determining the data R.

If the data R are meaningful data, the server 2 interprets the data R transmitted by the client 1. However, data interpretation is not the characteristic gist of the present invention, and hence its explanations are omitted.

Second Embodiment

Figure 3:
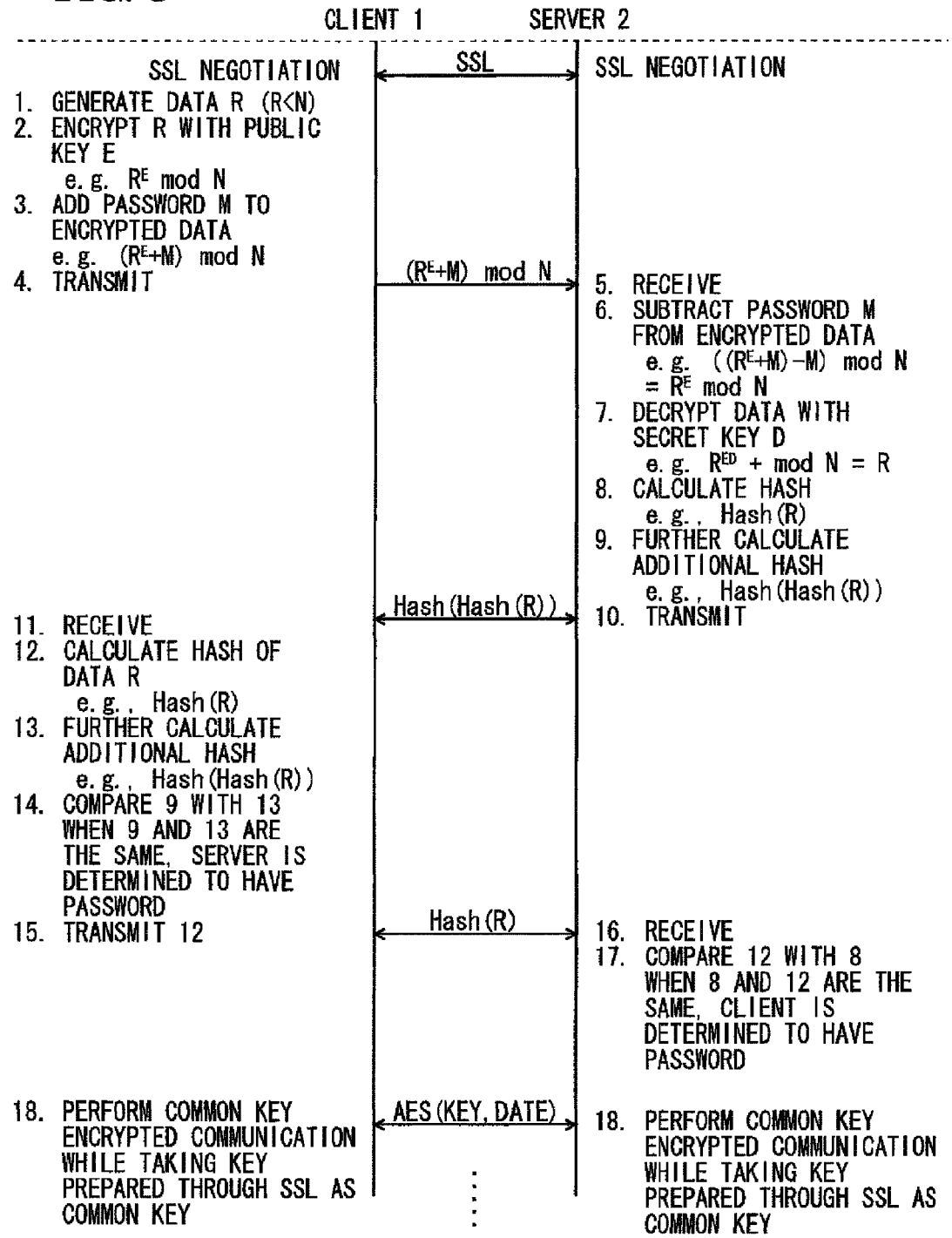
FIG. 3 is a diagram showing data exchange procedures of a second embodiment of the present invention.

FIG. 3 is a diagram showing data exchange procedures of a second embodiment of the present invention. In the second embodiment, the client transmits the secret data R to the server and ascertains whether or not the server is an authorized server holding the password M according to whether or not the server can submit the secret data R to the client. Thus, safe, secret communication is carried out.

The present invention relates to a method by means of which the client ascertains whether or not the server is an authorized server. FIG. 3 provides an explanation to such an extent that the server 2 ascertains whether or not the client 1 is an authorized client. The reason for this is that a true safe secret communication that excludes involvement of the MITM can be carried out by means of a bidirectional check.

However, the essence of a bidirectional check lies in a method for ascertaining an authorized server that is the present invention. So long as the authorized server can be ascertained in advance, subsequent ascertainment of an authorized client is not difficult. In fact, various check methods can be used. FIG. 3 shows an example method for ascertaining an authorized client.

Ordinary SSL negotiations are established between the client 1 and the server 2. The public key E and the public key N of the server 2 are transferred to the client 1 at this point in time Transfer of the public keys is not limited to SSL encrypted communication and can also be performed by means of an E-mail or by hand. Any means can also be used for transferring the public keys.

1: The client generates data R in FIG. 3. Although the data R are unknown even to the server and secret for third parties, it is desirable to adopt as the data R cryptographically safe random numbers (i.e., random numbers for which next random numbers cannot be estimated from a random number sequence that has already been generated), because this will improve a security level.

In order to protect the data from offline attacks, cryptographically safe length is desirable for the random numbers. 2: The data R are encrypted by means of a public key, to thus determine $[R^E \bmod N]$. 3: The password M is added to $[R^E \bmod N]$, thereby determining $[(R^E+M) \bmod N]$ that is a residue of the modulus N. Although the password M is added to $[R^E \bmod N]$, the password M can also be subtracted from $[R^E \bmod N]$.

So long as the password M is added to or subtracted from $[R^E \bmod N]$, it will also become possible to protect the data from special offline attacks, such as "password guessing attacks" as well as from online attacks and ordinary offline attacks. An extremely short bit length should be avoided so that the data will be protected from offline attacks. 4: [($R^E$+M) mod N] is transmitted to the server.

5: In the meantime, the server receives [($R^E$+M) mod N] from the client. 6: The password M is subtracted from [($R^E$+M) mod N] (the password M is added when the client has subtracted the password M from [($R^E$+M) mod N]), thereby determining a residue [$R^E$ mod N] of the modulus N. 7: [$R^E$ mod N] is decrypted by means of the secret key D and the public key N owned by the server, thereby determining the data R.

8: A hash value of the data R; namely, [Hash(R)] is calculated. 9: An additional hash value of [Hash(R)]; namely, [Hash(Hash(R))], is calculated. 10: [Hash(Hash(R))] is transmitted to the client.

In a case where the server submits the data R themselves to the client, attackers can make offline attacks using the data R in case they can sniff transmitted and received data. For this reason, the data R are processed by means of a one-way function, thereby preventing back calculation of the data R themselves.

The reason why hash calculation is performed twice is that the client submits a hash value of the data R to prove itself to be an authenticated client. If the client proves itself to be an authenticated client by means of another method, the server can perform hash calculation only once. The number of times hash calculation is performed is not a substantial problem. Although the data R themselves are subjected to hash calculation, another data stemming from the data R can also be subjected to hash calculation.

11: the client then receives [Hash(Hash(R))]. 12: The client calculates the hash value of the data R prepared by itself; namely, [Hash(R)]. 13: Further, the client calculates a hash value of [Hash(R)]; namely, [Hash(Hash(R))].

Calculations described in connection with 12 and 13 can also be performed in advance without receiving [Hash(Hash(R))] described in connection with 11. 14: [Hash(Hash(R))] received from the server is compared with [Hash(Hash(R))] calculated by itself. If both of them are determined to be identical with each other, the server is determined to be an authorized server that holds the password M. When the server has been identified as an unauthorized server, an error can be returned immediately, or communication can be shut off. From the viewpoint of safety, it is better to conduct appropriate dummy communications for a given period of time.

15: The client transmits [Hash(R)] calculated by itself to the server. The client can anew calculate [Hash(R)]. Although the client is hereunder described as proving itself as an authorized client by submitting [Hash(R)] to the server, various methods can be selected as the submitting method.

Since the server has already proven itself to be an authorized server at this point in time, the public key transferred to the client is reliable. Accordingly, the data R and the password M may also be encrypted by utilization of the public keys (including a hybrid code language), and the thus-encrypted data and password may also be submitted. For instance, it is also possible to encrypt the data R and the password M by means of a common key for SSL encrypted communication and submit the thus-encrypted data and the password. The password M can also be encrypted by means of taking the data R as a common key, and the thus-encrypted password can also be submitted.

16: The server receives [Hash(R)]. 17: The server compares [Hash(R)] received from the client with [Hash(R)] calculated by itself. If they are determined to be identical with each other, the server determines that the client is an authorized client holding the password M. The server can anew calculate [Hash(R)]. When the client has been identified to be an unauthorized client, an error can be returned immediately, or communication can be shut off. From the viewpoint of safety, it is better to conduct appropriate dummy communications for a given period of time. As a result of both the server and the client having ascertained that their counterparts are an authorized client and an authorized server, an environment of safe, secret communication eliminating intervention of the MITM can thus be established.

18: Both the client and the server perform common key encrypted communication using their KEYs prepared through SSL encrypted communication. Performing common key encrypted communication is intended to enhance performance, and hence encrypted communication can also be continuously performed by means of public key encryption. Although the KEY prepared through SSL encrypted communication are herein described as being used as an example key, common key encryption can also be performed while the data R or another data generated from the data R are taken as a KEY. The common key is not limited to the KEY for SSL encrypted communication. FIG. 3 shows an AES encryption scheme as an example common key encryption scheme. However, DES or another encryption scheme can also be used.

In the following descriptions, "difficult-to-back-calculate arithmetic processing that poses extreme difficulty on back calculation" implies a one-way function, such as a hash and a square. However, calculation processing is not limited to them. No limitations are imposed on a technique, so long as the technique makes it impossible for attackers to perform back calculation.

For instance, both parties of communication employ the method described in connection with the first invention of the present patent application, and data R1 are transferred from the client to the server. The client and the server are interchanged in such a way that the party received the data R1 becomes a client and that the party transmitted the data R1 becomes a server. The client transfers data R2 to the server at this time by use of the method defined in claim 1. In this case, [R1×R2 mod N], or the like, can be said to be "difficult-to-back-calculate arithmetic processing that poses extreme difficulty on back calculation."

If difficult-to-back-calculate arithmetic processing means exhibiting a high level of cryptographic safety is used, attacks from attackers, such as those for back-calculating the data R from the data R processed by use of difficult-to-back-calculate arithmetic processing, will be completely prevented. Therefore, means exhibiting a high security level should be selected.

Difficult-to-back-calculate arithmetic processing is not limited to once. Difficult-to-back-calculate arithmetic processing that poses extreme difficulty on back calculation can also be performed a plurality of times; for instance, twice and three times. Further, difficult-to-back-calculate arithmetic processing is not limited to one type of calculation processing. Difficult-to-back-calculate arithmetic processing includes cases where different types of difficult-to-back-calculate arithmetic processing are carried out a plurality of times. Subjecting data to different types of hash calculation processing in consideration of a future risk of cracking of hash calculation is a common practice in the field of cryptography, which is desirable. However, each of the client and the server is presumed to finally assume a result that is obtained when the data R undergoes the same calculation processing even if calculation processing will change in terms of; for instance, calculation sequence.

An expression "subjecting data including information about a least a portion of the data R (including data generated by processing a portion or the entirety of the data R) to difficult-to-back-calculate arithmetic processing" means as it is understood from the description that the data R themselves are not limited to difficult-to-back-calculate arithmetic processing. So long as a certain value K is encrypted while the data R are taken as a common key and the encrypted data are transferred from the server to the client, the server can also subject data K (including a portion of the data K) to difficult-to-back-calculate arithmetic processing and submit at least a portion of the data K to the client. The data K can be said to be generated by subjecting the data R to data processing.

When the data R are subjected to data processing, data processing is not always performed by only the server in a closed manner. If the client transmits to the server data that are generated by encrypting a certain value K while taking the data R as a common key, the server decrypts the encrypted data by use of the data R, to thus acquire the data K. The data K (including a portion of the data K) can also be subjected to difficult-to-back-calculate arithmetic processing, and at least a portion of the data K can also be submitted to the client. This can also be said that the data K are generated by means of subjecting the data R to data processing.

Under the method of the present invention, the authorized client can clearly ascertain whether or not the server is an authorized server by checking whether or not the server has a password. Accordingly, it is possible to determine whether or not to stop following communications. Specifically, it is possible to create a basis where secret communications can be safely established between an authorized client and an authorized server without intervention of the MITM.

In order to completely eliminate intervention of the MITM, it is important to prevent an attacker from behaving like an authorized client as well as like an authorized server. To this end, it is desirable that the server will check whether or not the client is an authorized client.

After the server can have been identified as an authorized server by means of the method of the present invention, the public key transferred to the client is understood to belong to the authorized server. Therefore, the client can prove itself to be an authorized client by sending the data, which have been generated by encrypting the password, to the server through use of the public key (including a hybrid code language).

If the client has a public key and a secret key that differ from their counterparts of the server, the server can ascertain whether or not the client is an authorized client by means of performing analogous (to the second invention described in connection with the present patent application) processing in reverse order (in other words, performing processing through the same procedures while the party called the server is interchanged with the party called the client and also the party called the client is interchanged with the party called the server). Further, the server can also check that the client is an authorized client even when the client processes the data R through use of difficult-to-back-calculate arithmetic operation means differing from those used by the server and transmits the thus-processed data R to the server.

The following is the simplest method. Specifically, the server processes the data R by use of difficult-to-back-calculate arithmetic processing means, additionally processes the data R by use of the difficult-to-back-calculate arithmetic processing means (e.g., determines another hash value of a hash value of the data R), and transmits the thus-obtained value to the client. The client processes the data R by use of the same difficult-to-back-calculate arithmetic processing means (to determine; for instance, the hash value of the data R) and sends the thus-determined value to the server. Each of the client and the server checks the value sent from its counterpart. In order to avoid offline attacks, the server must first submit the processed data R as described in connection with the present invention.

As mentioned above, under the method of the present invention, after the server can have been identified as an authorized server, there are various methods for checking a client. If a check is made as to whether or not the client is an authorized client, the attacker cannot behave like an authorized client.

In this case, an attacker may behave like an authorized client and send to the server data that are generated by encrypting number A known to the attacker by means of the public keys E and N; namely, $[A^E \bmod N]$, in place of $[(R^E + M) \bmod N]$ and by use of; for instance, RSA public-key cryptography, and acquire data returned from the server; for instance, [Hash (R)], thereby making offline attacks.

However, the authorized server performs two-term expansion of the $D^{th}$ power; for instance, $[(A^E - M)^D \bmod N]$, by use of a secret key D having an extremely long bit length. Therefore, it is cryptographically impossible for the attacker to look into the data R $(=[(A^E - M)^D \bmod N])$ in a round-robin manner.

There is no necessity to notify the server and the client of results as to whether or not their respective counterparts have the password. When the attacker uses an automatic program that challenges the password by changing a candidate for the password one after another until a correct password is hit, the acknowledgement of the result may be utilized by the attacker. Even when any of the parties is identified to be an unauthorized party, it is better not to shut off the communication immediately for similar reasons. It will be better to perform an appropriate dummy communication for a given period of time.

Although the data R are described as one unknown to third parties, it is desirable that the data R will be a value that even the authorized server cannot estimate. This does not always mean that the data R are random numbers. Even when the data R are meaningful for the authorized server, attackers can neither estimate nor calculate the data R if the moment of transmission of the data R is unknown even to the authorized server, so that the data R will be safe. However, from the viewpoint of enhancement of security, it is desirable that the data R be coded in random numbers. In particular, use of cryptographically safe random numbers is desirable (i.e., random numbers for which the next random numbers cannot be estimated from a random number sequence that has already been generated).

In order to solve such a problem, each of the client and the server has common key encryption means that encrypts and decrypts a common key, as described in connection with the third invention of the present invention. A common key (including a common key generated by taking at least a portion of the data R as an original key) generated from at least a portion of the data R is used for the common key encryption means, thereby conducting encrypted communications between the client and the server.

The common key encryption means referred to herein simply means a technique that is not the public key encryption method. Available encryption techniques are various. Further, the minimum requirements for the data R are to become involved in generation of a common key in some form. For instance, when SSL encrypted communication is in the course of being conducted, a common key can also be generated by multiplying the thus-generated common key by the data R.

Figure 4:
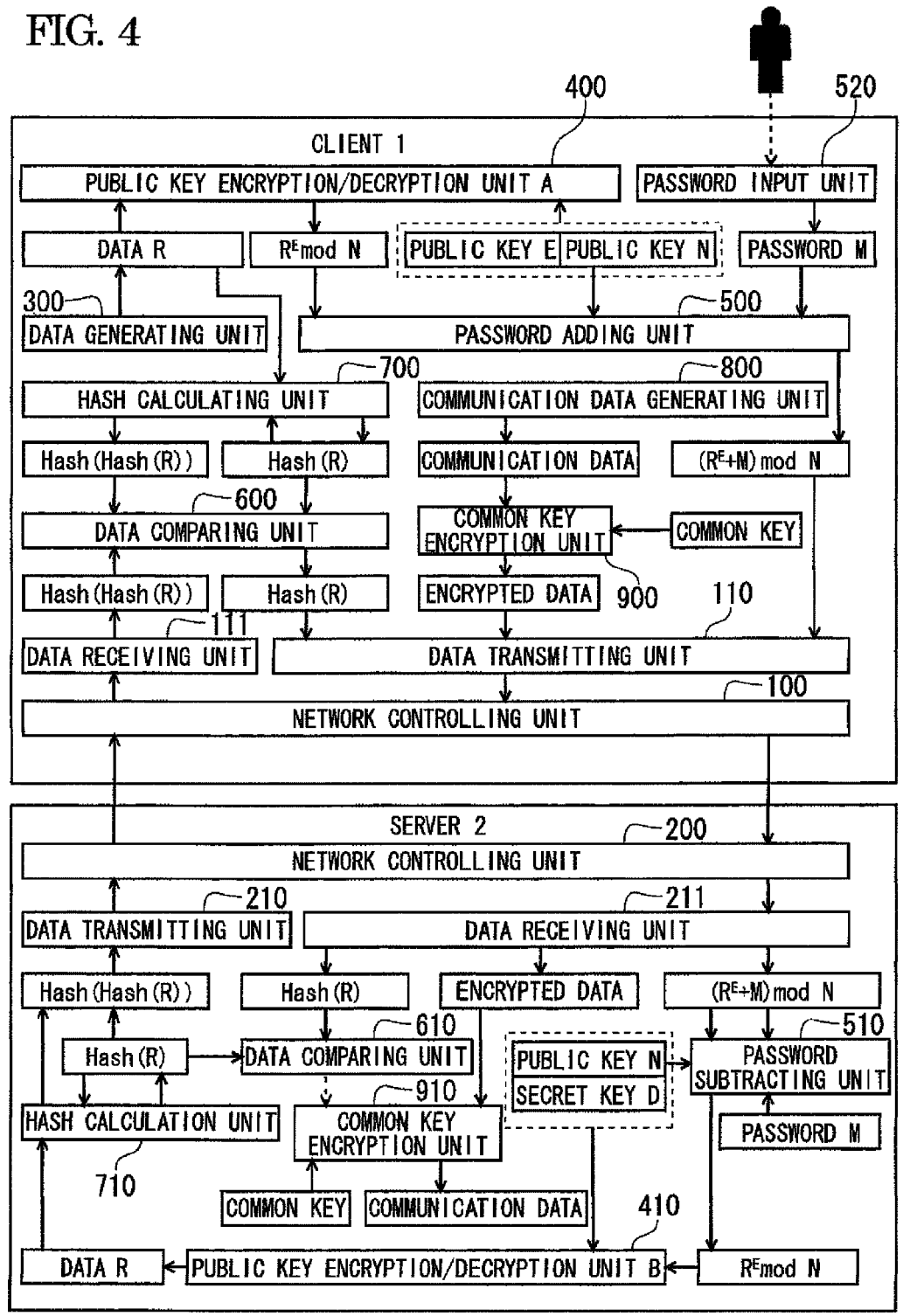
FIG. 4 is a block diagram of the second embodiment of the present invention.

FIG. 4 is a block diagram of the second embodiment of the present invention. The client 1 acquires a password M from the user by use of the password input unit 520 and conducts secret communications with the server 2 that previously stores and retains the password M.

The client 1 can also store and retain the password M in advance in the same way as does the server 2. Alternatively, the user may also input the password M of the server 2 in the case where the user goes to the server 2 to use it; for instance, the case where the server 2 is a printer, or in the case of a client-server conference system in which the user also uses a server-side terminal (the server-side user is different from a client-side user).

To begin with, the client 1 starts making a connection to the server 2, thereby conducting SSL negotiations. The public key E and the public key N of the server 2 are transferred to the client 1 at this point in time.

The client 1 asks the user to enter a password by use of the password input unit 520 before and after the SSL negotiations.

The user enters the password M by use of the password input unit 520.

The data generating unit 300 generates the data R asynchronously with the SSL negotiations and the input of the password. If the data R are unknown even to the server and secret for third parties, that will be desirable. However, it is more desirable to adopt as the data R cryptographically safe random numbers (i.e., random numbers for which the next random numbers cannot be estimated from a random number sequence that has already been generated), because this will improve a security level. Moreover, in order to protect the data from offline attacks, a cryptographically safe bit length is desirable for the random numbers.

The public key encryption/decryption unit A 400 encrypts the data R by use of the public keys E and N, thereby calculating [$R^E$ mod N].

The password adding unit 500 next adds the password M to [$R^E$ mod N], thereby acquiring a residue of the modulus N; namely, [($R^E$+M) mod N]. So long as the password M is added as mentioned above, it will also become possible to protect the data from special offline attacks, such as "password guessing attacks," as well as from online attacks and ordinary offline attacks.

Reference symbol M does not necessarily mean a password itself though it also applies to FIG. 3. Reference symbol M can also be a value generated by subjecting a password to data processing. In reality, subjecting the password to data processing by use of random number data exchanged between the client and the server or unique value information, such as address information, is desirable because it enhances a security level.

The data transmitting unit 110 transmits [$R^E$+M) mod N] to the server 2 by way of the network controlling unit 100. The data receiving unit 211 receives [($R^E$+M) mod N] by way of the network controlling unit 200.

The password subtracting unit 510 subtracts the password M from [$R^E$+M) mod N], thereby determining a residue of the modulus N; namely, [$R^E$ mod N].

In the case of [($R^E$+M) mod N]<M, a result of the password M being subtracted from [($R^E$+M) mod N] becomes negative. Since the calculation is residue calculation, the result comes to a "positive" value when N (a multiple of N) is added to the residue.

The public key encryption/decryption unit B 410 decrypts [$R^E$ mod N] by use of the secret key D and the public key N owned by the server 2, thereby determining the data R.

A hash calculation unit 710 calculates a hash value of the data R; namely, [Hash(R)]. The hash calculation unit 710 further calculates a hash value of [Hash(R)]; namely, [Hash(Hash(R))].

In the case where the server 2 submits the data R themselves to the client 1, attackers can make offline attacks using the data R in case the attackers can sniff transmitted and received data. For this reason, the data R are processed by means of a one-way function, thereby preventing back calculation of the data R themselves. Moreover, the reason why hash calculation is performed twice is that a hash value of the data R is submitted to the server 2 in order to prove that the client is an authenticated client. If the client proves itself to be an authenticated client by means of another method, the server 2 can perform hash calculation only once. The number of times hash calculation is performed is not a substantial problem.

A data transmitting unit 210 transmits [Hash(Hash(R))] to the client 1 by way of the network controlling unit 200. A data receiving unit 111 receives [Hash(Hash(R))] by way of the network controlling unit 100.

A hash calculation unit 700 calculates a hash value of the data R generated by the data generating unit 300; namely, [Hash(R)]. The hash calculation unit 700 further calculates a hash value of [Hash(R)]; namely, [Hash(Hash(R))]. The calculation can also be performed in advance without awaiting receipt of the preceding hash value [Hash(Hash(R))].

A data comparing unit 600 compares [Hash(Hash(R))] received from the server 2 with [Hash(Hash(R))] calculated by the hash calculation unit 700. If they are determined to be identical with each other, the server 2 is determined to be an authorized server having the password M. When the server 2 has identified to be an unauthorized server, an error can be immediately returned, or communication can be shut off. However, from the viewpoint of safety, it is better to carry out appropriate dummy communications for a given period of time.

The data comparing unit 600 transmits the hash value [Hash(R)] calculated by the hash calculation unit 700 to the data transmitting unit 110.

The client 1 is herein supposed to prove itself to be an authorized client by submitting [Hash(R)] to the server 2. Various methods can be used as the submission method. Since the server 2 is already identified to be an authorized server at this point in time, the public key transferred to the client 1 is trustable.

Accordingly, the data R and the password M can also be encrypted by utilization of the public key (including a hybrid code language), and the thus-encrypted data and password may be submitted. For instance, the data R and the password M can also be encrypted by a common key for SSL encrypted communication, and the thus-encrypted data and password can be submitted. Further, the password M can also be encrypted by means of taking the data R as a common key, and the thus-encrypted password can also be submitted.

The data transmitting unit 110 transmits [Hash (R)] to the server 2 by way of the network controlling unit 100.

The data receiving unit 211 receives [Hash (R)] by way of the network controlling unit 200.

Next, the data comparison unit 610 compares [Hash(R)] received from the client 1 with [Hash(R)] calculated by the hash calculation unit 710. When both hash values are determined to be identical with each other, the client 1 is determined to be an authorized client retaining the password M. The hash calculation unit 710 can also renew calculation of [Hash (R)] at this time. When the client has been identified to be an unauthorized client, an error can be immediately returned, or communication can be shut off. However, from the viewpoint of safety, it is better to conduct appropriate dummy communications for a given period of time.

As a result of the client 1 and the server 2 having been respectively identified as an authorized client and an authorized server, an environment of safety secret communications that eliminates intervention of the MITM can have been thus established.

A communication data generating unit 800 generates communication data desired to be transmitted to the server 2. The communication data generating unit 800 can also be the same as the data generating unit 300 (when having the function of generating random number data, the data generating unit 300 comes to differ from the communication data generating unit 800).

In FIG. 4, the communication data generating unit 800 generates and transmits communication data without receiving a transmission OK trigger from the server 2. However, transmission of communication data can be performed at any time.

However, before the client 1 and the server 2 are not yet identified to be an authorized client and an authorized server, the MITM may already intervene between them. Accordingly, secret communication data cannot be transferred between the client 1 and the server 2 by means of common key encryption. For these reasons, timing at which the client 1 can transmit secret communication data to the server 2 comes to a point in time when the data comparing unit 600 of the client 1 can have identified the server 2 as an authorized server.

However, at this point in time the server 2 has not yet identified the client 1 as an authorized client. For this reason, communication data from the client 1 are not trustable for the server 2. Therefore, there is a possibility that the server 2 will have to retain the communication data from the client 1. Consequently, it is preferable for the communication data generating unit 800 to generate communication data after the client 1 has transmitted the hash value [Hash(R)] to the server 2.

Alternatively, the server 2 will send a transmission OK trigger to the client 1, and the trigger may also be taken as a cue for commencing communication.

A common key encryption unit 900 encrypts communication data by use of the common key ("KEY" shown in FIG. 3) prepared through SSL encrypted communication, thereby generating encrypted data.

The data transmitting unit 110 transmits the encrypted data to the server 2 by way of the network controlling unit 100.

The data receiving unit 211 receives the encrypted data through the network controlling unit 200.

A common key encryption unit 910 decrypts the encrypted data by use of the common key ("KEY" shown in FIG. 3) prepared through SSL encrypted communication, thereby acquiring communication data. An attempt is herein made to carry out common key encrypted communication in order to enhance performance. Therefore, encrypted communication can also be continually performed by means of public key encryption.

Although the KEY prepared through the SSL encrypted communication are herein described as being used as the common key, the data R or another data stemming from the data R can also be used as a common key. The common key is not limited to the common key prepared through the SSL encrypted communication.

In FIG. 4, the client 1 starts performing common key encrypted communication, but the communication may also be commenced from the other side. In this case, the server 2 can start common encrypted communication at any moment as in the case with the client 1. However, for the same reasons as those described previously, it is desirable to commence communication after the client 1 has been identified as an authorized client.

Third Embodiment

Figure 5:
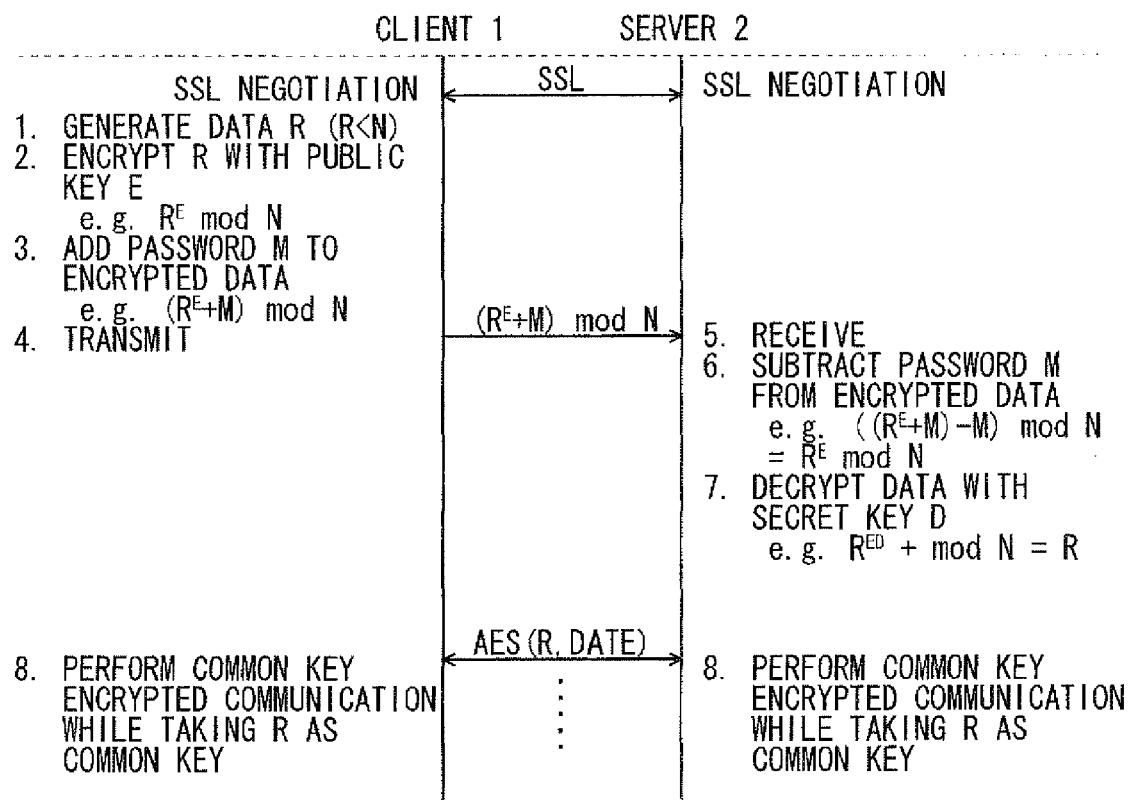
FIG. 5 is a diagram showing data exchange procedures of a third embodiment of the present invention.

FIG. 5 is a diagram showing data exchange procedures of a third embodiment of the present invention. In the third embodiment, the client transmits the secret data R to the server and performs common key encryption between the server and the client by utilizing the secret data R as a common key, thereby conducting safe secret communication.

Ordinary SSL negotiations are established between the client and the server. The public key E and the public key N of the server are transferred to the client at this point in time. Transfer of the public keys is not limited to SSL communication and can also be performed by means of an E-mail or by hand. Any means can also be used for transferring the public keys.

1: The client generates data R in FIG. 5. Although the data R are unknown even to the server and secret for third parties, it is desirable to adopt as the data R cryptographically safe random numbers (i.e., random numbers for which the next random numbers cannot be estimated from a random number sequence that has already been generated), because this will improve a security level. In order to protect the data from offline attacks, a cryptographically safe bit length is desirable for random numbers.

2: The data R are now encrypted by means of a public key, to thus determine $[R^E \bmod N]$. 3: The password M is added to $[R^E \bmod N]$, thereby determining $[(R^E+M) \bmod N]$ that is a residue of the modulus N. Although the password M is added to $[R^E \bmod N]$, the password M can also be subtracted from the same. So long as the password M is added to or subtracted from $[R^E \bmod N]$, it will also become possible to protect the data from special offline attacks, such as "password guessing attacks" as well as from online attacks and ordinary offline attacks. In order to protect the password M from online attacks, an extremely short bit length should be avoided. 4: $[(R^E+M) \bmod N]$ is transmitted to the server.

5: In the meantime, the server receives $[(R^E+M) \bmod N]$ from the client. 6: The password M is subtracted from $[(R^E+M) \bmod N]$ (the password M is added when the client has subtracted the password M from $[R^E \bmod N]$), thereby determining a residue $[R^E \bmod N]$ of the modulus N. 7: $[R^E \bmod N]$ is decrypted by means of the secret key D and the public key N owned by the server, thereby determining the data R.

8: Both the client and the server perform common key encrypted communication while taking the data R as a common key. Another data stemming from the data R may also be taken as a common key in place of the data R. FIG. 5 schematically shows an AES encryption technique as an example common key encryption technique. However, DES or another encryption technique can also be used.

In order to conduct truly-safe secret communication that eliminates intervention of the MITM, it is better for the client to check that the server is an authorized server. For instance, it is better for the client to prepare the random number data K, encrypt the data K by means of the data R that are the common key, transmit the thus-encrypted data K, and check whether or not the server can submit the data K to the client.

When attackers can sniff transmitted/received data and acquire the data K, they can make offline attacks. Therefore, the server should not submit the data K themselves to the client. Although various safe submitting methods are available, submitting a hash value of the data K; for instance, is sufficient.

Subsequently, it is better for the server to check that the client is an authorized client. Although various methods are also available for a check, the followings that are the reverse of the foregoing steps; for instance, are sufficient. Namely, the server prepares random number data L, encrypts the data L by use of the data R that are the common key, transmits the thus-encrypted data L, and checks whether or not the client can submit the data L to the server. Even in this case, for instance, it is better to submit a hash value of the data L in order to protect the data from offline attacks.

Alternatively, it is also possible to perform mutual validation by means of the methods shown in FIGS. 3 and 4. In any event, performing mutual validation enables performance of safer secret communication. However, mutual validation is not always indispensable. If either the client or the server is an attacker, the common key will not be valid, which will fail to establish communication. However, performing mutual validation will be more preferable, because it will lead to a higher security level.

Under the method of the present invention, the data R transmitted by the authorized client are transmitted solely to the authorized server. Therefore, so long as encrypted communication is performed while the data R are taken as a common key, there can be founded a basis where it is possible to establish safe secret communication between an authorized client and an authorized server without intervention of the MITM.

It is better to encrypt authentication data by means of the common key and mutually transfer the thus-encrypted authentication data between the client and the server before performance of actual data communication, thereby mutually checking whether parties of communication on both sides are an authenticated client and an authenticated server, because this will enhance a safety level. Alternatively, after both the client and the server have ascertained whether or not parties of communication on both sides are an authorized client and an authorized server and subsequently by means of the method described in connection with the second invention of the present patent application, common key encryption utilizing the data R can also be performed.

There may be a case where attacks will be made on security vulnerability of a selected common key encryption technique or a generated common key. Accordingly, adopting a common key encryption technique and a common key generation method exhibiting sufficient security intensity is desirable. For instance, in relation to generation of a common key, it is better to make a contrivance on generation of a common key; for instance, a contrivance to mix random number data or address information exchanged between the client and the server into the data R, to thus generate a common key.

As can be seen from the expression "the data R are values unknown to third parties," it is desirable to adopt as the data R values that even an authorized server cannot estimate. This does not always mean that the data R are random numbers. Even when the data R are meaningful for the authorized server, attackers can neither estimate nor calculate the data R if the moment of transmission of the data R is unknown even to the authorized server, so that the data R will be safe. However, from the viewpoint of enhancement of security, it is desirable that the data R be coded in random numbers. In particular, use of cryptographically safe random numbers (i.e., random numbers for which the next random numbers cannot be estimated from a random number sequence that has already been generated) is desirable.

In the fourth invention of the present patent application, in order to solve such a problem, the server also has the public key encryption/decryption means 1 in the same manner as does the client. Both the client and the server encrypt data including at least a portion of information about a password (including data generated by processing a portion or the entirety of a password) by use of the public key encryption/decryption means 1; and take data including at least a portion of information about the encrypted data (including a portion of the encrypted data or another data generated by processing the entirety of the encrypted data) as the data M.

This also makes it difficult for attackers to make special offline attacks.

Although an offline attacking method called "e-Residue Attacks" has hitherto been known in connection with; for instance, EKE, such as [$MR^E$ mod N], the method cannot be an effective attacking method for the present technique.

The "e-Residue Attacks" are attacks in which an attacker behaves like a server and transfers unauthorized public keys E and N(gcd(E,φ(N))≠1)) that disproportionately bias the residue of the modulus N of the $E^{th}$ power toward a specific value (so as not to generate a uniform distribution) for the case of; for instance, RSA public-key cryptography. An authorized client encrypts the data R by use of the unauthorized public keys, thereby generating data multiplied by the password. The attacker can also acquire the data and make offline attacks.

The attacker estimates tentative data M with regard to the thus-acquired data. Further, the attacker determines data from which the tentative data M are removed; namely, tentative data generated as a result of the data R being encrypted by the public key, by means of back calculation. Depending on whether or not the tentative data assume specific values, the tentative password is presumed to be correct or incorrect. If the tentative data determined by back calculation have not come to a specific value, the presumed data M can be determined to be incorrect. The presumed data M can therefore be eliminated from candidates for the correct data M. The attacker checks all of the data M; namely, all values that the password can assume, and can narrow down the candidates for an authorized password offline. Considerably narrowing down the number of password candidates becomes possible if above-mentioned processing is iterated a number of times.

The password usually has a bit length long enough to withstand online attacks. However, if the attacker has sufficiently narrowed down the password candidates in advance by means of the offline attacks, it will finally become easy for the attacker, by means of online attacks, to check which one of the password candidates is a valid password.

However, when the data M including information about a password are also encrypted by means of a public key, in the case where an unauthorized public key, such as that mentioned above, is transferred, the data M will also be concurrently biased toward a specific value (will not distribute uniformly). Therefore, the attacker becomes impossible to make attacks, such as those mentioned above, to the password.

At first glance, even in the case of EKE, the data M seem to be protected from attacks, so long as the data M are encrypted by means of a public key. For instance, if [$MR^E$ mod N] is encrypted like [$M^E R^E$ mod N], an attacker can intervene between an authorized client and an authorized server and behave like a server to the authorized client and transfers its public key to the authorized client. Further, the attacker can also make bucket bridge attacks on-line (i.e., online attacks) while behaving like a client toward the authorized server.

The reason for this is that, since the attacker can calculate [$(M^E R^E)^D$ mod N]=[(MR) mod N] by use of its own E, N, and D, the attacker can calculate $[(M^{E'}R^{E'}) \bmod N']$ from $[(MR) \bmod N]$ by use of E', N' owned by the authorized server and transfer the thus-computed residue to the authorized server. If this is the case, neither the authorized client nor the authorized server can detect intervention of the MITM, and the MITM can decrypt the encrypted data. (Residues $[(M+R)^E \bmod N]$ and $[(M-R)^E \bmod N]$ that differ in type from the residues described in connection with the present invention also experience MITM attacks for the same reason). Even when $[MR^E \bmod N]$ is converted into $[M^E R^{EE} \bmod N]$ to avoid the potential of such attacks, the attacker can still make attacks by transferring unauthorized public keys E and N, such as those that bias the residue of the modulus N of the square of E toward a specific value (so as not to uniformly distribute).

In the present invention, when the authorized client transfers; for instance, $[(R^E+M^E) \bmod N]$, to the server, an attacker may transfer its own authorized public key to the client while behaving like a server and calculate $[(R^E+M^E)^D \bmod N]$ by use of its own D. Even in such a case, the residue includes coefficients of two-term expansion of $R^E$ and $M^E$. Therefore, it is cryptographically difficult to calculate $[(R^{E'}+M^{E'}) \bmod N']$ using the public keys E' and N' of the authorized server.

Accordingly, the attacker cannot intervene between the authorized client and the authorized server, transfer its own public key while behaving like the server to the authorized client, and make bucket brigade attacks on-line (i.e., online attacks) while pretending like a client to the authorized server. Specifically, even when the data M have changed to data $M^{E1}$, the attacks will not come into effect as described in connection with other claims.

Further, even when the attacker merely behaves like a server, the attacker cannot send back a correct response value to the client because the attacker does not know data $M(M^{E1})$. Even when the data M have changed to the data $M^{E1}$, the attacks do not come into effect as described in connection with the other inventions.

Further, the attacker may behave like the authorized client and send; for instance, data prepared by encrypting its known number A by means of the public keys E and N; namely, $[A^E \bmod N]$, to the server in place of $[(R^E+M^E) \bmod N]$, acquire data sent back from the server; for instance, [Hash (R)], and make offline attacks.

However, the authorized server performs two-term expansion; for instance, $[(A^E-M^E)^D \bmod N]$, by use of a secret key D having an extremely long bit length. Hence, as in the case of the second invention, it is cryptographically difficult for attackers to look into data R $(=[(A^E-M^E)^D \bmod N])$ in a round-robin fashion.

As mentioned above, unlike EKE, in the present invention the data M including information about a password can be encrypted by means of a public key as in the case of the data R. Hence, the data M can be protected from special offline attacks.

An attacker can also make the following attacks to the authorized client while behaving like a server.

For instance, in the case of EKE, (A) An attacker transfers a public key E=P−1 and a public key N=P (P is a prime number) to the client.

(B) Upon receipt of the data, the authorized client transfers $[MR^E \bmod N]=[MR^{(P-1)} \bmod P]$ to the attacker.

When the greatest common factor of the data R and the data P is one, $[R^{(P-1)} \bmod P]=1$ stands according to Fermat's little theorem. Hence, $[MR^{(P-1)} \bmod P]=M$ is derived, and the attacker can acquire the data M.

On the contrary, in the case of the present invention, (A) The attacker transfers a public key E=P−1 and a public key N=P (P is a prime number) to the client.

(B) Upon receipt of the data, the authorized client transfers $[R^E-M^E] \bmod N]=[(R^{(P-1)}-M^{(P-1)}) \bmod P]$ to the attacker.

When the greatest common factor of the data R and the data P is one, $[R^{(P-1)} \bmod P]=1$ and $[M^{(P-1)} \bmod P]=1$ stand according to Fermat's little theorem. Hence, $[(R^{(P-1)}+M^{(P-1)}) \bmod P]=2$ is derived, and the attacker cannot acquire the data M.

The above is also true of the followings. Greatly unlike EKE, in the present invention, the data M including information about a password can also be encrypted by means of a public key as in the case of the data R. Therefore, the data M can also withstand special offline attacks, such as those mentioned above. Specifically, even when any attempts are made to tamper with the public keys E and N, the data M will also change to a peculiar value as does the data R. Therefore, the offline attacks that are made while the data R are taken as a clue do not come into effect.

The special offline attacks including "e-Residue Attacks," such as those mentioned above, are very difficult to prevent by means of the related art method, such as EKE. Accordingly, the present invention is highly effective.

Even when the attacker merely behaves like a server, the attacker cannot send back a correct response value to the client, because it does not know the data M ($M^{E'}$). Even when the data M have changed to the data $M^{E1}$, the attacks do not come into effect as described in connection with the other inventions.

Further, the attacker may behave like the authorized client and send; for instance, data prepared by encrypting its known number A by means of the public keys E and N; namely, $[A^E \bmod N]$, to the server in place of $[(R^E+M^E) \bmod N]$, acquire data sent back from the server; for instance, [Hash (R)], and make offline attacks.

However, the authorized server performs two-term expansion; for instance, $[(A^E-M^E)^D \bmod N]$, by use of a secret key D having an extremely long bit length. Hence, as in the case of the second invention, it is cryptographically difficult for attackers to look into data R $(=[(A^E-M^E)^D \bmod N])$ in a round-robin fashion.

As mentioned above, unlike EKE, in the present invention the data M including information about a password can be encrypted by means of a public key as in the case of the data R. Hence, the data M can be protected from special offline attacks.

An attacker can also make the following attacks to the authorized client while behaving like a server.

For instance, in the case of EKE, (A) An attacker transfers a public key E=P−1 and a public key N=P (P is a prime number) to the client.

(B) Upon receipt of the data, the authorized client transfers $[MR^E \bmod N]=[MR^{(P-1)} \bmod P]$ to the attacker.

When the greatest common factor of the data R and the data P is one, $[R^{(P-1)} \bmod P]=1$ stands according to Fermat's little theorem. Hence, $[MR^{(P-1)} \bmod P]=M$ is derived, and the attacker can acquire the data M.

On the contrary, in the case of the present invention, (A) The attacker transfers a public key E=P−1 and a public key N=P (P is a prime number) to the client.

(B) Upon receipt of the data, the authorized client transfers $[R^E-M^E] \bmod N]=[(R^{(P-1)}-M^{(P-1)}) \bmod P]$ to the attacker.

When the greatest common factor of the data R and the data P is one, $[R^{(P-1)} \bmod P]=1$ and $[M^{(P-1)} \bmod P]=1$ stand according to Fermat's little theorem. Hence, $[(R^{(P-1)}+M^{(P-1)}) \mod P]=2$ is derived, and the attacker cannot acquire the data M.

The above is also true of the followings. Greatly unlike EKE, in the present invention, the data M including information about a password can also be encrypted by means of a public key as in the case of the data R. Therefore, the data M can also withstand special offline attacks, such as those mentioned above. Specifically, even when any attempts are made to tamper with the public keys E and N, the data M will also change to a peculiar value as does the data R. Therefore, the offline attacks that are made while the data R are taken as a clue do not come into effect.

The special offline attacks including "e-Residue Attacks," such as those mentioned above, are very difficult to prevent by means of the related art method, such as EKE. Accordingly, the present invention is highly effective.

Figure 6:
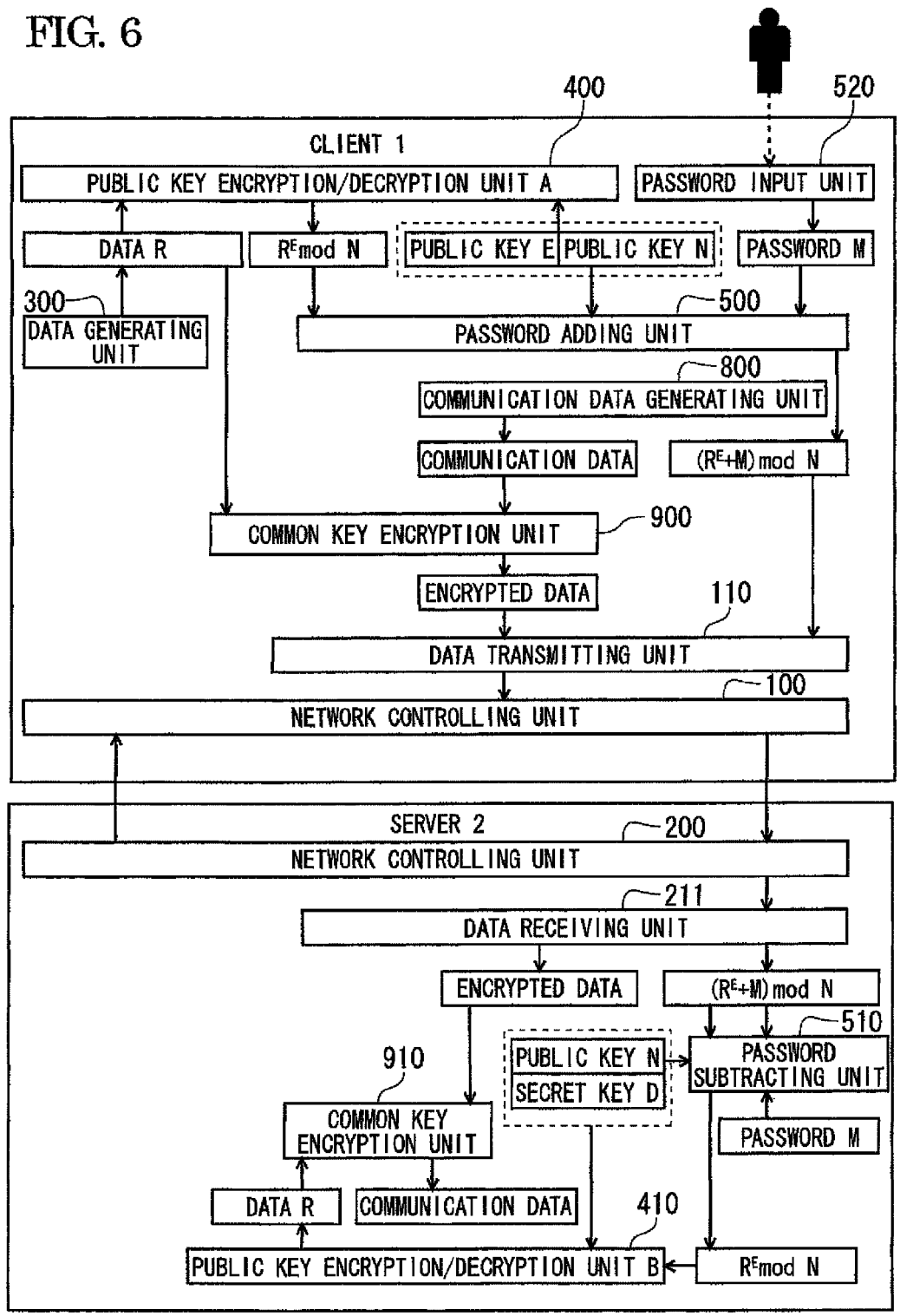
FIG. 6 is a block diagram of the third embodiment of the present invention.

FIG. 6 is a block diagram of the third embodiment of the present invention. The client 1 is configured so as to acquire the password M from the user by use of the password input unit 520 and establish a secret communication with the server 2 that previously stores and retains the password M. The client 1 can also store and retain the password M in advance in the same way as does the server 2. Alternatively, the user may also input the password M of the server 2 in the case where the user goes to the server 2 to use it; for instance, the case where the server 2 is a printer, or in the case of a client-server conference system in which the user also uses a server-side terminal (the server-side user is different from a client-side user).

To begin with, the client 1 starts making a connection to the server 2, thereby conducting SSL negotiations. The public key E and the public key N of the server 2 are transferred to the client 1 at this point in time.

The client 1 asks the user to enter a password before or after SSL negotiations by use of the password input unit 520.

The user inputs the password M by use of the password input unit 520.

The data generating unit 300 generates the data R asynchronously with the SSL negotiations and the input of the password. If the data R are unknown even to the server 2 and secret for third parties, that will be desirable. However, it is more desirable to adopt as the data R cryptographically safe random numbers (i.e., random numbers for which the next random numbers cannot be estimated from a random number sequence that has already been generated), because this will improve a security level. Moreover, in order to protect the data from offline attacks, a cryptographically safe bit length is desirable for random numbers.

The public key encryption/decryption unit A 400 encrypts the data R by use of the public keys E and N, thereby calculating $[R^E \mod N]$. The password adding unit 500 next adds the password M to $[R^E \mod N]$, thereby acquiring a residue of the modulus N; namely, $[(R^E+M) \mod N]$.

So long as the password M is added as mentioned above, it will also become possible to protect the password M from special offline attacks, such as "password guessing attacks," as well as from online attacks and ordinary offline attacks. Reference symbol M does not necessarily mean a password itself though it also applies to FIG. 5. Reference symbol M can also be a value generated by subjecting a password to data processing. In reality, subjecting the password to data processing by use of random number data exchanged between the client 1 and the server 2 or unique value information, such as address information, is desirable because it enhances a security level.

The data transmitting unit 110 transmits $[(R^E+M) \mod N]$ to the server 2 by way of a network controlling unit 100.

The data receiving unit 211 receives $[(R^E+M) \mod N]$ by way of the network controlling unit 200.

The password subtracting unit 510 subtracts the password M from $[(R^E+M) \mod N]$, thereby determining a residue of the modulus N; namely, $[R^E \mod N]$.

In the case of $[(R^E+M) \mod N]<M$, a result of the password M being subtracted from $[(R^E+M) \mod N]$ becomes negative. Since the calculation is residue calculation, the result comes to a "positive" value when N (a multiple of N) is added to the residue.

The public key encryption/decryption unit B 410 decrypts $[R^E \mod N]$ by use of the secret key D and the public key N owned by the server 2, thereby determining the data R.

The communication data generating unit 800 generates communication data desired to be transmitted to the server 2. The communication data generating unit 800 can also be the same as the data generating unit 300 (when having the function of generating random number data, the data generating unit 300 comes to differ from the communication data generating unit 800).

The client can prepare communication data at any time. However, it would be better that the client will generate the communication data after transmitting $[(R^E+M) \mod N]$, because both the client 1 and the server 2 will already be ready to perform common key encrypted communication.

The common key encryption unit 900 encrypts communication data by taking the data R as a common key, thereby preparing encrypted data. The data transmitting unit 110 transmits the encrypted data to the server 2 by way of the network controlling unit 100. The data receiving unit 211 receives the encrypted data through the network controlling unit 200.

The common key encryption unit 910 decrypts the encrypted data by taking the data R as a common key, thereby acquiring the communication data. Another data stemming from the data R in place of the data R can also be taken as the common key. In FIG. 6, the client 1 starts common key encrypted communication. However, the communication can also be started in reverse sequence.

Fourth Embodiment

Figure 7:
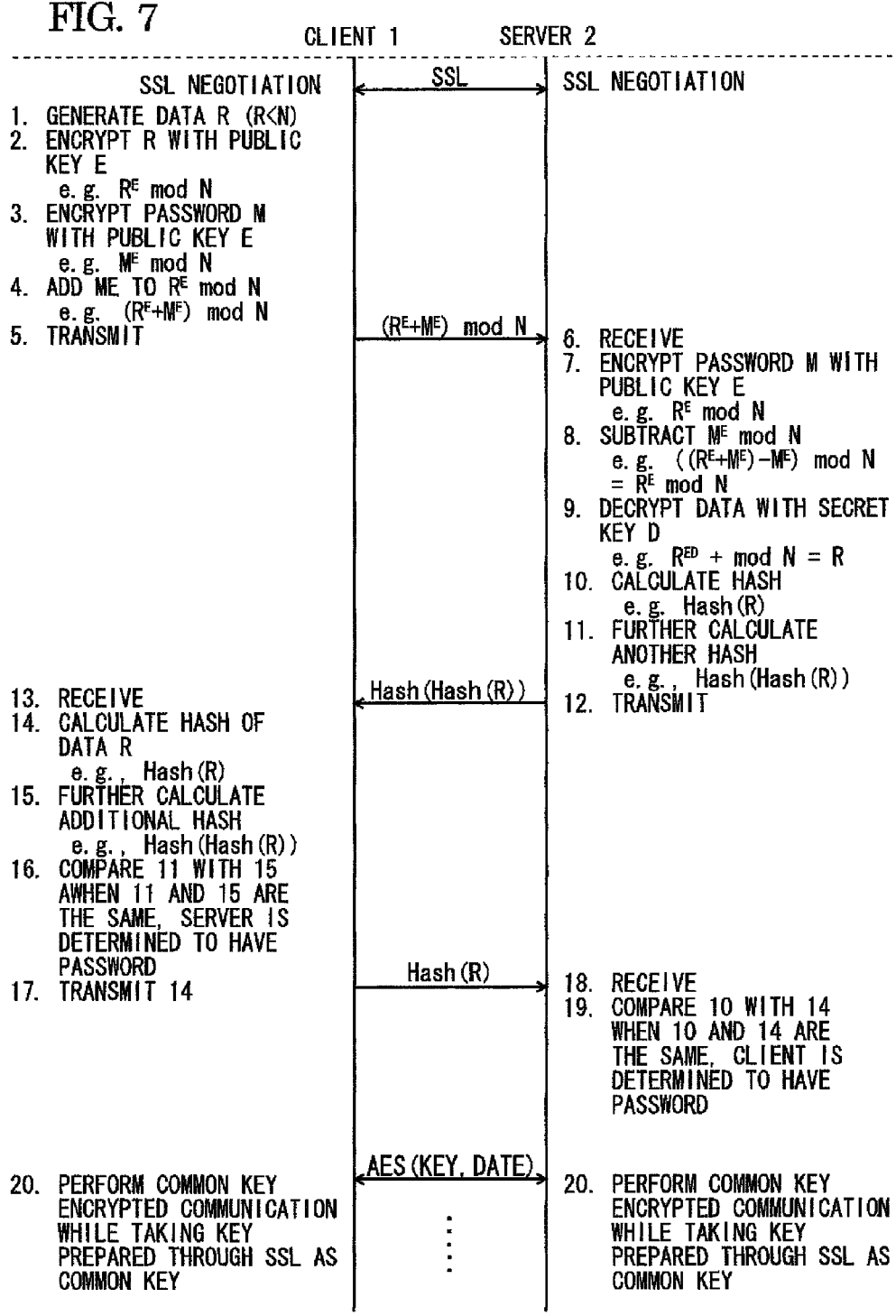
FIG. 7 is a diagram showing data exchange procedures of a fourth embodiment of the present invention.

FIG. 7 is a diagram showing data exchange procedures of a fourth embodiment of the present invention. In a fourth embodiment, the client sends secret data R to the server, and it is checked whether or not the server is an authorized server having the password M, on the basis of whether or not the server can submit the secret data R to the client. Thus, safe, secret communication is carried out.

The present invention relates to a method for letting a client check whether or not the server is an authorized server. In FIG. 7, descriptions are provided up to the point where the server also checks whether or not the client is an authorized client. The reason for this is that safe, secret communication that truly eliminates intervention of the MITM can be performed by means of bidirectional checking. However, the essence of the present invention lies in a method for checking an authorized server described in connection with the present invention. If the authorized server can be ascertained first, a subsequent step of ascertaining an authorized client will not be difficult. In fact, various checking methods and techniques can be used. FIG. 7 shows an example method for checking an authorized client.

Ordinary SSL negotiations between the client and the server are performed. The public key E and the public key N of the sever are transferred to the client at this point in time. However, transfer of the public keys is not limited to SSL communication. The public keys can also be transferred by means of an E-mail or by hand. Any means may also be used for transferring the public keys.

1: The client generates data R in FIG. 7. Although the data R are unknown even to the server and secret for third parties, it is desirable to adopt as the data R cryptographically safe random numbers (i.e., random numbers for which the next random numbers cannot be estimated from a random number sequence that has already been generated), because this will improve a security level. Further, in order to protect the data from offline attacks, a cryptographically safe bit length is desirable for random numbers. 2: The data R are now encrypted by means of a public key, to thus determine $[R^E \bmod N]$. 3: The password M is encrypted by means of the public keys asynchronously with calculation of $[R^E \bmod N]$, thereby determining $[M^E \bmod N]$.

When the password M is stored in the client apparatus, $[M^E \bmod N]$ is stored in the client apparatus, thereby making it possible to omit calculation of $[M^E \bmod N]$. 4: Data $M^E$ are added to $[R^E \bmod N]$, thereby determining $[(R^E + M^E) \bmod N]$ that is a residue of the modulus N. $M^E$ is herein added to $[M^E \bmod N]$ but may also be subtracted from the same.

Thus, the password M is also encrypted by means of the same public keys in the same case of the data R. So long as the password M is added to or subtracted from $[M^E \bmod N]$, it becomes possible to protect the password M from special offline attacks, such as "e-Residue Attacks" and "password guessing attacks" as well as from online attacks and ordinary offline attacks. It is better for the password M to avoid an extremely short bit length so as not to experience the online attacks. 5: In the meantime, $[(R^E + M^E) \bmod N]$ is transmitted to the server.

6: The server receives $[(R^E + M^E) \bmod N]$ from the client. 7. The password M is encrypted by means of the public keys asynchronously with receipt of $[R^E \bmod N]$, thereby determining $[M^E \bmod N]$. When the password M is stored in the server, $[M^E \bmod N]$ is stored in the server, thereby making it possible to omit calculation of $[M^E \bmod N]$. Saving $[M^E \bmod N]$ is better than saving raw password data in the server in terms of a security level. 8: The data $M^E$ are subtracted from $[(R^E + M^E) \bmod N]$ (the data $M^E$ are added if the client has subtracted the data $M^E$), thereby determining a residue of the modulus N, or $[R^E \bmod N]$. 9: The server decrypts $[R^E \bmod N]$ by means of the secret key D and the public key N belonging to the server, thereby determining the data R. 10: A hash value of the data R; namely, [Hash (R)], is calculated. 11: A hash value of [Hash (R)]; namely, [Hash (Hash(R))], is calculated. 12: The hash value [Hash (Hash(R))] is transmitted to the client.

In a case where the server submits the data R themselves to the client, attackers can make offline attacks using the data R in case they can sniff transmitted and received data. For this reason, the data R are processed by means of a one-way function, thereby preventing back calculation of the data R themselves.

The reason why hash calculation is performed twice is that a hash value of the data R is submitted to the server in order to prove that the client is an authenticated client. If the client proves itself to be an authenticated client by means of another method, the server can perform hash calculation only once. The number of times hash calculation is performed is not a substantial problem. Although the data R themselves are subjected to hash calculation, another data stemming from the data R can also be subjected to hash calculation.

13: the client then receives [Hash(Hash(R))]. 14: The client calculates the hash value of the data R prepared by itself; namely, [Hash(R)]. 15: Further, the client calculates a hash value of [Hash(R)]; namely, [Hash(Hash(R))]. The calculations can also be performed in advance without receiving [Hash(Hash(R))] described in connection with 13. 16: [Hash (Hash(R))] received from the server is compared with [Hash (Hash(R))] calculated by itself. If both of them are determined to be identical with each other, the server is determined to be an authorized server that holds the password M.

When the server has been identified as an unauthorized server, an error can be returned immediately, or communication can be shut off. From the viewpoint of safety, it is better to conduct appropriate dummy communications for a given period of time. 17: The client transmits [Hash(R)] calculated by itself to the server. The client can anew calculate [Hash (R)].

Although the client is hereunder described as proving itself to be an authorized client by submitting [Hash(R)] to the server, various methods can be selected as the submitting method. Since the server has already proven itself to be an authorized serve at this point in time, the public key transferred to the client is reliable. Accordingly, the data R and the password M may also be encrypted by utilization of the public keys (including a hybrid code language), and the thus-encrypted data and password may also be submitted.

For instance, it is also possible to encrypt the data R and the password M by means of a common key for SSL encrypted communication and submit the thus-encrypted data and the password. The password M can also be encrypted by means of taking the data R as a common key, and the thus-encrypted password can also be submitted.

18: The server receives [Hash(R)]. 19: The server compares [Hash(R)] received from the client with [Hash(R)] calculated by itself. If they are determined to be identical with each other, the server determines that the client is an authorized client holding the password M. The server can anew calculate [Hash(R)]. When the client has been identified to be an unauthorized client, an error can be returned immediately, or communication can be shut off. From the viewpoint of safety, it is better to conduct appropriate dummy communications for a given period of time.

As a result of both the server and the client having ascertained that their counterparts are an authorized client and an authorized server, an environment of safe, secret communication eliminating intervention of the MITM can thus be established. 20: Both the client and the server perform common key encrypted communication using their KEYS prepared through SSL encrypted communication.

Performing common key encrypted communication is intended to enhance performance, and hence encrypted communication can also be continuously performed by means of public key encryption. Although the KEY prepared through SSL encrypted communication are herein described as being used as an example key, common key encryption can also be performed while the data R or another data generated from the data R are taken as a KEY. The common key is not limited to the KEY for SSL encrypted communication. FIG. 7 shows an AES encryption scheme as an example common key encryption scheme. However, DES or another encryption scheme can also be used.

Figure 8:
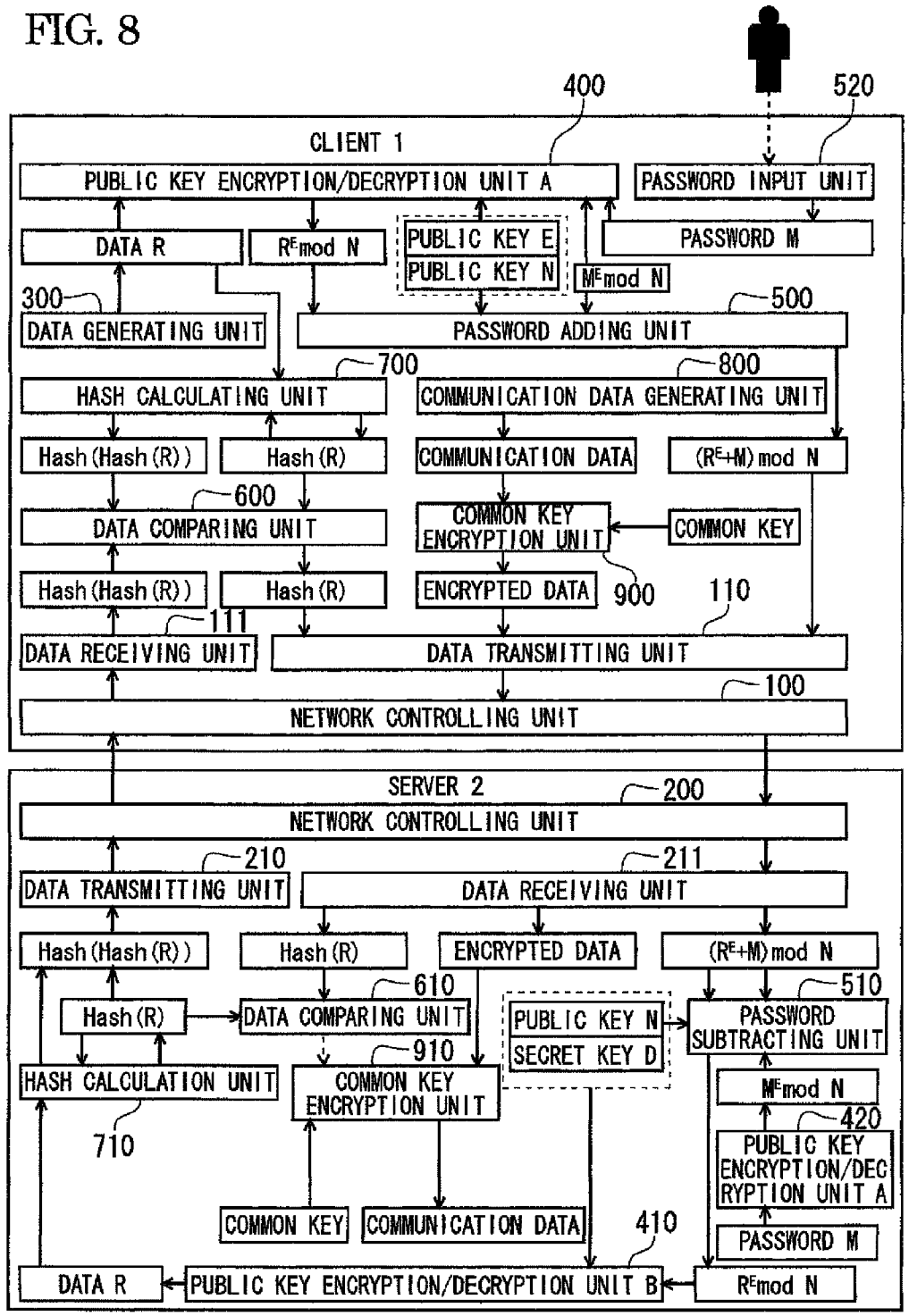
FIG. 8 is a block diagram of the fourth embodiment of the present invention.

FIG. 8 is a block diagram of the fourth embodiment of the present invention shown in FIG. 7. The client 1 acquires a password M from the user by use of the password input unit 520 and conducts secret communications with the server 2 that previously stores and retains the password M. The client 1 can also store and retain the password M in advance in the same way as does the server 2. Alternatively, the user may also input the password M of the server 2 in the case where the user goes to the server 2 to use it; for instance, the case where the server 2 is a printer, or in the case of a client-server conference system in which the user also uses a server-side terminal (the server-side user is different from a client-side user).

To begin with, the client 1 starts making a connection to the server 2, thereby conducting SSL negotiations. The public key E and the public key N of the server 2 are transferred to the client 1 at this point in time.

The client 1 asks the user to enter a password by use of the password input unit 520 before and after the SSL negotiations.

The user enters the password M by use of the password input unit 520.

The data generating unit 300 generates the data R asynchronously with the SSL negotiations and the input of the password. If the data R are unknown even to the server 2 and secret for third parties, that will be desirable. However, it is more desirable to adopt as the data R cryptographically safe random numbers (i.e., random numbers for which the next random numbers cannot be estimated from a random number sequence that has already been generated), because this will improve a security level. Moreover, in order to protect the data from offline attacks, a cryptographically safe bit length is desirable for random numbers.

The public key encryption/decryption unit A 400 encrypts the data R by use of the public keys E and N, thereby calculating [$R^E$ mod N]. The public key encryption/decryption unit A 400 encrypts the password M by use of the public keys E and N asynchronously with calculation of [$R^E$ mod N], thereby calculating [$M^E$ mod N]. When the password M is stored in the client, [$M^E$ mod N] is stored in the client 1, and calculation of [$M^E$ mod N] can be omitted.

The password adding unit 500 next adds the data $M^E$ to [$R^E$ mod N], thereby acquiring a residue of the modulus N; namely, [($R^E$+$M^E$) mod N]. So long as the password M is encrypted by the same public keys as are the data R and added as mentioned above, it will also become possible to protect the password M from special offline attacks, such as "e-Residue Attacks" and "password guessing attacks," as well as from online attacks and ordinary offline attacks. Reference symbol M does not necessarily mean a password itself though it also applies to FIG. 7. Reference symbol M can also be a value generated by subjecting a password to data processing. In reality, subjecting the password to data processing by use of random number data exchanged between the client 1 and the server 2 or unique value information, such as address information, is desirable because it enhances a security level.

The data transmitting unit 110 transmits [($R^E$+$M^E$) mod N] to the server 2 by way of the network controlling unit 100.

The data receiving unit 211 receives [($R^E$+$M^E$) mod N] by way of the network controlling unit 200. A public key encryption/decryption unit A 420 encrypts the password M by use of the public keys E and N, thereby calculating [$M^E$ mod N]. The public key encryption/decryption unit A 420 is equivalent to the public key encryption/decryption unit A 400. This calculation can be performed at any time. If the server 2 stores [$M^E$ mod N], the calculation can be omitted.

The password subtracting unit 510 subtracts the data $M^E$ from [($R^E$+$M^E$) mod N], thereby determining a residue of the modulus N; namely, [$R^E$ mod N].

In the case of [($R^E$+$M^E$) mod N]<M, a result of the data $M^E$ being subtracted from [($R^E$+$M^E$) mod N] becomes negative. Since the calculation is residue calculation, the result comes to a "positive" value when N (a multiple of N) is added to the residue.

The public key encryption/decryption unit B 410 decrypts [$R^E$ mod N] by use of the secret key D and the public key N owned by the server 2, thereby determining the data R.

The hash calculation unit 710 calculates a hash value of the data R; namely, [Hash(R)]. The hash calculation unit 710 further calculates a hash value of [Hash(R)]; namely, [Hash (Hash(R))].

In the case where the server 2 submits the data R themselves to the client 1, attackers can make offline attacks using the data R in case the attackers can sniff transmitted and received data. For this reason, the data R are processed by means of a one-way function, thereby preventing back calculation of the data R themselves.

Moreover, the reason why hash calculation is performed twice is that a hash value of the data R is submitted to the server 2 in order to prove that the client 1 is an authenticated client. If the client proves itself to be an authenticated client by means of another method, the server 2 can perform hash calculation only once. The number of times hash calculation is performed is not a substantial problem.

The data transmitting unit 210 transmits [Hash(Hash(R)] to the client 1 by way of the network controlling unit 100.

The data receiving unit 111 receives [Hash(Hash(R))] by way of the network controlling unit 100.

The hash calculation unit 700 calculates a hash value of the data R generated by the data generating unit 300; namely, [Hash(R)]. The hash calculation unit 700 further calculates a hash value of [Hash(R)]; namely, [Hash(Hash(R))]. The calculation can also be performed in advance without awaiting receipt of the preceding hash value [Hash(Hash(R))].

The data comparing unit 600 compares [Hash(Hash(R))] received from the server 2 with [Hash(Hash(R))] calculated by the hash calculation unit 700. If they are determined to be identical with each other, the server 2 is determined to be an authorized server having the password M. When the server 2 has identified to be an unauthorized server, an error can be immediately returned, or communication can be shut off. However, from the viewpoint of safety, it is better to carry out appropriate dummy communications for a given period of time.

The data comparing unit 600 transmits the hash value [Hash(R)] calculated by the hash calculation unit 700 to the data transmitting unit 110.

The client 1 is herein supposed to prove itself to be an authorized client by submitting [Hash(R)] to the server 2. Various methods can be used as the submission method. Since the server 2 is already identified to be an authorized server at this point in time, the public key transferred to the client is trustable.

Accordingly, the data R and the password M can also be encrypted by utilization of the public key (including a hybrid code language), and the thus-encrypted data and password may be submitted. For instance, the data R and the password M can also be encrypted by a common key for SSL encrypted communication, and the thus-encrypted data and password can be submitted. Further, the password M can also be encrypted by means of taking the data R as a common key, and the thus-encrypted password can also be submitted. The data transmitting unit 110 transmits [Hash (R)] to the server 2 by way of the network controlling unit 100. The data receiving unit 211 receives [Hash (R)] by way of the network controlling unit 200.

Next, the data comparison unit 610 compares [Hash(R)] received from the client with [Hash(R)] calculated by the hash calculation unit 710. When both hash values are determined to be identical with each other, the client is determined to be an authorized client retaining the password M. The hash calculation unit 710 can also renew calculation of [Hash (R)] at this time. Further, when the client has been identified to be an unauthorized client, an error can be returned immediately, or communication can be shut off. However, from the viewpoint of safety, it is better to conduct appropriate dummy communications for a given period of time.

As a result of the client 1 and the server 2 having been respectively identified as an authorized client and an authorized server, an environment of safety secret communications that eliminates intervention of the MITM can thus be established.

The communication data generating unit 800 generates communication data desired to be transmitted to the server 2. The communication data generating unit 800 can also be the same as the data generating unit 300 (when having the function of generating random number data, the data generating unit 300 comes to differ from the communication data generating unit 800).

In FIG. 8, the communication data generating unit 800 generates and transmits communication data without receiving a transmission OK trigger from the server 2. However, transmission of communication data can be performed at any time.

However, before the client 1 and the server 2 are not yet identified to be an authorized client and an authorized server, the MITM may already intervene between them. Accordingly, secret communication data cannot be transferred between the client 1 and the server 2 by means of common key encryption. For these reasons, timing at which the client 1 can transmit secret communication data to the server 2 comes to a point in time when the data comparing unit 600 of the client can have identified the server 2 as an authorized server.

However, at this point in time the server 2 has not yet identified the client 1 as an authorized client. For this reason, communication data from the client 1 are not trustable for the server 2. Therefore, there is a possibility that the server 2 will have to retain the communication data from the client 1. Consequently, it is preferable for the communication data generating unit 800 to generate communication data after the client 1 has transmitted the hash value [Hash (R)] to the server 2.

Alternatively, the server 2 will send a transmission OK trigger to the client 1, and the trigger may also be taken as a cue for commencing communication.

The common key encryption unit 900 encrypts communication data by use of the common key ("KEY" shown in FIG. 7) prepared through SSL encrypted communication, thereby generating encrypted data. The data transmitting unit 110 transmits the encrypted data to the server 2 by way of the network controlling unit 100. The data receiving unit 211 receives the encrypted data through the network controlling unit 200.

The common key encryption unit 910 decrypts the encrypted data by use of the common key ("KEY" shown in FIG. 7) prepared through SSL encrypted communication, thereby acquiring communication data. An attempt is herein made to carry out common key encrypted communication in order to enhance performance. Therefore, encrypted communication can also be continually performed by means of public key encryption. Although the common key prepared through the SSL communication is described as being used as the common key, the data R or another data stemming from the data R can also be used as a common key. The common key is not limited to the common key prepared through the SSL encrypted communication.

In the drawing, the client 1 starts performing common key encrypted communication, but the communication may also be commenced from the other side. In this case, the server 2 can start common encrypted communication at any moment as in the case with the client 1. However, for the same reasons as those described previously, it is desirable to commence communication after the client has been identified as an authorized client.

Figure 9:
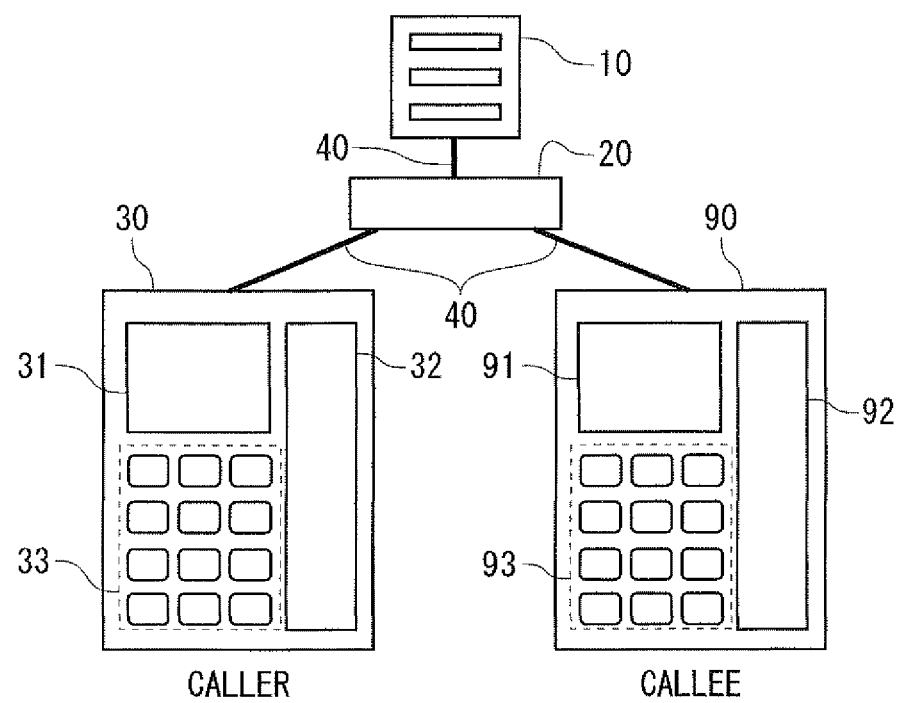
FIG. 9 is a configuration diagram sowing a network PBX (Network Private Branch eXchange) using the present invention.

FIG. 9 is a configuration diagram showing a network PBX (Network Private Branch eXchange) using the present invention.

In FIG. 9, reference numeral 40 designates a network cable; 10 designates a network PBX; 20 designates an HUB; and 30 designates a slave terminal (a phone) of the PBX. The slave terminal (the phone) 30 that is a caller includes a display unit 31, a telephone receiver 32, and the numerical pad (an input unit) 33. The slave terminal (the phone) 90 that is a callee includes a display unit 91, a telephone receiver 92, and a numerical pad (an input unit) 93.

Figure 10:
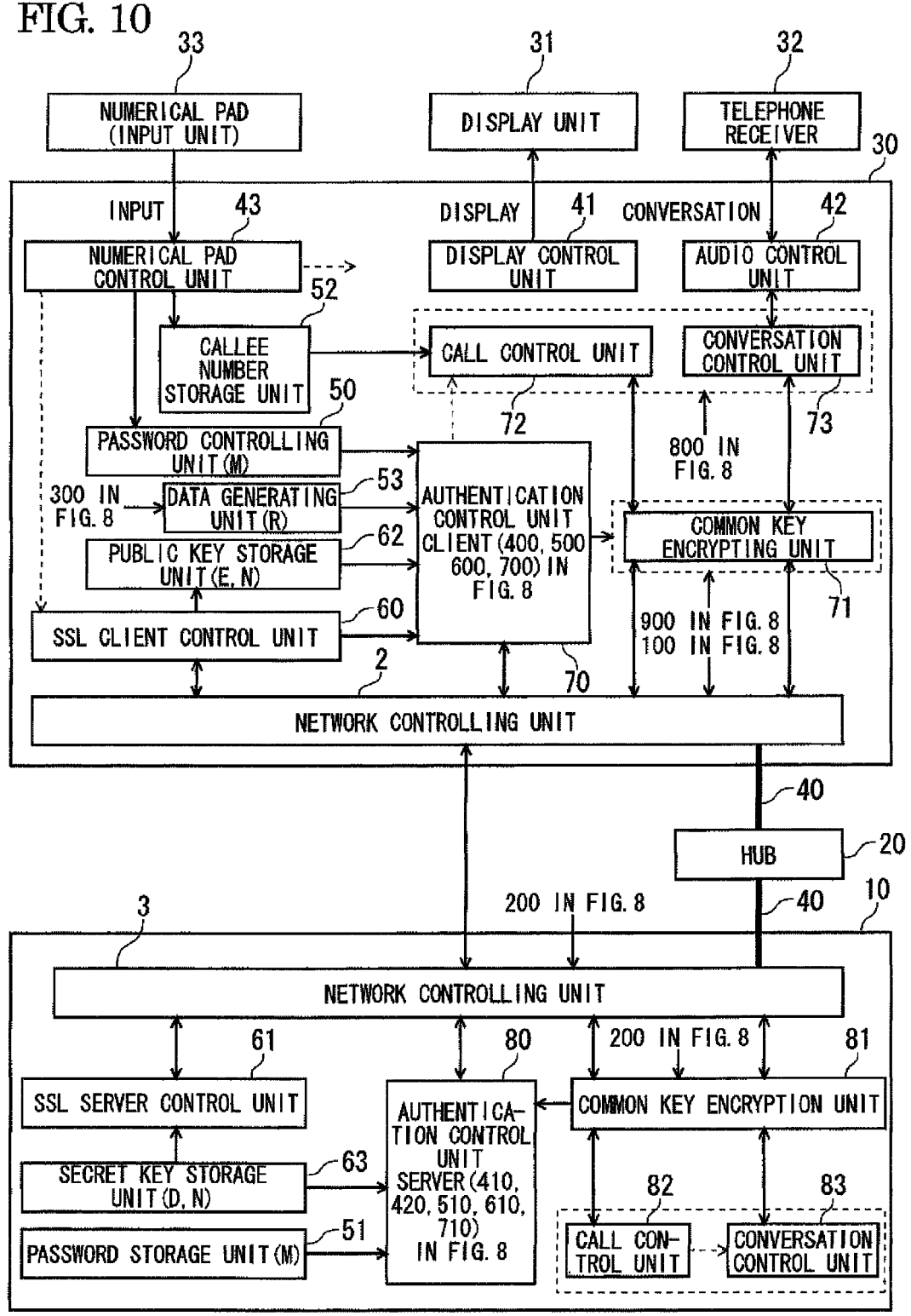
FIG. 10 is a block diagram of a network PBX using the present invention.

FIG. 10 is a block diagram of a network PBX using a secret communication method of the present invention. In FIG. 10, reference numeral 40 designates a network cable; 10 designates a network PBX; 20 designates an HUB; 30 designates a slave terminal (a phone) of the PBX; 31 designates a screen for prompting the user to enter a password and a display unit showing a screen for prompting the user to enter a phone number of a callee; 32 designates a telephone receiver used for making conversation; and 33 designates a numerical pad (an input unit) by way of which the user enters a password and a phone number of a callee in the same way as shown in FIG. 9.

The slave terminal (the phone) 30 and the network PBX 10 are connected to each other by means of the network cable 40 through the HUB 20. Network communication is established between the network controlling unit 100 and the network controlling unit 200, thereby exchanging data. In connection with all operations for exchanging data between the slave terminal (the phone) 30 and the network PBX 10, the network controlling units 100 and 200 play roles to transmit and receive data to and from the network. However, in order to simplify explanations, explanations about the network controlling units 100 and 200 are omitted hereunder. The network controlling units 100 and 200 are equivalent to the network controlling units 100 and 200 shown in FIG. 8.

First, as shown in FIG. 10, a display control unit 41 displays on the display unit 31 a screen for prompting the user to enter a password.

The user who desires to make a phone call enters his/her ID (e.g., numerics 0 to 9, an ID having about eight digits, and finally "*") by use of the numerical pad 33 and proceeds to enter his/her password (e.g., numerics 0 to 9, a password having about eight digits, and finally "#").

A numerical pad control unit 43 recognizes the input digits preceding the symbol "*" as an ID and also the input digits preceding the "#" as a password. Thus, the numerical pad control unit 43 stores both the ID and the password in a password controlling unit 50. Subsequently, the numerical pad control unit 43 notifies the display control unit 41 of completion of entry of the ID and the password.

The display control unit 41 displays on the display unit 31 a screen for prompting the user to enter a callee number.

The user who desires to make a phone call looks in a screen that prompts the user to enter a callee number and subsequently inputs a callee number by use of the numerical pad 33.

Upon detection of entry of the callee number, the numerical pad control unit 43 stores the callee number in a callee number storage unit 52 and notifies an SSL server client control unit 60 of completion of entry of the callee number.

The SSL client control unit 60 makes SSL negotiations with an SSL server control unit 61 (the SSL client control unit 60 initiates communication). Upon commencing SSL negotiations, the SSL client control unit 60 stores public keys received from the SSL server control unit 61 (i.e., the public key E and the public key N in the case of RSA public-key cryptography) in a public key storage unit 62. The SSL server control unit 61 conducts SSL negotiations by use of secret keys read from a secret key storage unit 63 (a secret key D and a public key N in the case of RSA public-key cryptography). The public key transferred from the SSL server control unit 61 to the SSL client control unit 60 is assumed to be stored in the secret key storage unit 63, as well. The SSL server control unit 61 is assumed to read the public keys E and N from the secret key storage unit 63 through SSL negations and transfer the thus-read keys to the SSL client control unit 60.

In the final phase of SSL negotiations, the SSL client control unit 60 independently prepares a common key used in a common key encryption unit 71, and the SSL server control unit 61 independently prepares a common key used in a common key encryption unit 81 (as is obvious from SSL specifications, these common keys are the same to both the SSL client control unit 60 and the SSL server control unit 61).

After completion of the SSL negotiations, the SSL client control unit 60 notifies an authentication control unit 70 of completion of the SSL negotiations. After success of the SSL negotiations, the slave unit (the phone) 30 and the network PBX 10 are connected together by means of SSL sessions (a virtual encrypted communication channel).

However, at this point in time, there is a fear of an attacker in the middle existing between the slave terminal (the phone) 30 and the network PBX 10, individually conducting SSL negotiations with the slave terminal (the phone) 30 and the network PBX 10, and being in the middle of making bucket brigade attacks. For these reasons, encrypted communication being performed through SSL sessions cannot be said to be safe.

According to the procedures described by reference to FIGS. 7 and 8, the authentication control unit 70 and a authentication control unit 80 ascertain whether or not their counterparts are an authenticated server and an authenticated client that retain passwords. Specifics are as follows.

(1) The authentication control unit 70 generates $[(R^E+M^E) \bmod N]$ from the password (M) read from a password storage unit 51, the public keys (the public key E and the public key N for the case of RSA public-key cryptography) read from the public key storage unit 62, and a random number (data R) generated by a data generating unit 53, and transmits the thus-generated $[(R^E+M^E) \bmod N]$ to the network PBX 10.

(2) The authentication control unit 80 back calculates the data R by means of the password (M) read from the password storage unit 51, the secret key and the public key (the secret key D, the public key E, and the public key N for the case of RSA public-key cryptography) read from the secret key storage unit 63, and $[(R^E+M^E) \bmod N]$ received from the authentication control unit 70. The authentication control unit 80 further calculates another hash value (Hash (Hash (R)) of this hash value and transmits the thus calculated hash value to the slave terminal (the phone) 30.

(3) The authentication control unit 70 calculates another hash value of the hash value of the data R generated by the data generating unit 53 and compares the thus-calculated hash value with the Hash(Hash(data)) received from the authentication control unit 80. If the hash values are the same, the authentication control unit recognizes the server as an authorized server retaining the password. Next, the hash value (Hash(R)) of the data R is transmitted to the network PBX 10.

(4) The authentication control unit 80 compares the Hash (R) calculated by itself with the Hash (R) received from the authentication control unit 70. If they are the same, the authentication control unit recognizes the client as an authorized client retaining the password. The authentication control unit 80 commands the authentication control unit 70 to start transmitting data.

On this occasion, the authentication control unit 80 must be able to specify which one of lots of user passwords stored in the password storage unit 51 is to be used for calculation. The ID input along with the password, for instance, can be used for this. The password storage unit 51 stores an ID and a corresponding password while tying them together, and imparts the ID to the data transmitted from the authentication control unit 70 to the authentication control unit 80. Thus, the authentication control unit 80 specifies the password to be used by means of the ID. A password can also be specified, so long as a phone number and the password are tied together. This will be good for the user, because there can be obviated laborious efforts to enter an ID by way of the slave terminal (the phone) 30 in this case. The method can be said to be suitable for a case where the slave terminal (the phone) 30 is a cellar phone personally owned by an individual user (i.e., a phone that is not commonly utilized).

Upon receipt of a command for commencing data transmission from the authentication control unit 80, the authentication control unit 70 commands a call control unit 72 equivalent to the communication data generating unit 800 shown in FIG. 8 to start controlling calls. When the authentication control unit 70 has determined that the server is not authorized or when the authentication control unit 80 has determined that the client is not authorized, the currently-established SSL sessions are shut off.

When the server and the client can have been ascertained to be authorized, the slave terminal (phone) 30 is already given the public keys of the network PBX 10 rather than the public keys of the attacker in the middle. Therefore, communication can safely be carried out. Even if the attacker in the middle exists between the slave terminal (phone) 30 and the network PBX 10, the attacker in the middle cannot decode contents of the data exchanged, so long as communication is conducted through SSL sessions (encrypted communication).

The call control unit 72 reads a callee number from the callee number storage unit 52 and performs call control operation conforming to; for instance, an SIP (Session Initiation Protocol), with respect to a call control unit 82 equivalent to the communication data generating unit 800 shown in FIG. 8. All data exchanged by means of call control are encrypted and decrypted by way of the common key encryption unit 71 equivalent to the common key encryption unit 900 shown in FIG. 8 and the common key encryption unit 81 equivalent to the common key encryption unit 910 shown in FIG. 8. Specifically, the data are safely communicated by means of SSL sessions (encrypted communication).

After the call control units 72 and 82 have finished performing call control operation, the call control unit 72 notifies a conversation control unit 73, which is equivalent to the communication data generating unit 800 shown in FIG. 8, of completion of call control. Likewise, after the call control units 72 and 82 have finished performing call control operation, the call control unit 82 notifies a conversation control unit 83 of completion of call control.

Audio data are exchanged between the conversation control unit 73 and the conversation control unit 83. All data to be exchanged are decrypted and encrypted by way of the common key encryption unit 71 and the common key encryption unit 81 as in the case of call control. Specifically, all of the data are safely communicated by means of SSL sessions (encrypted communication). Upon receipt of audio data, the conversation control unit 73 outputs a sound from the phone receiver 32 by way of an audio control unit 42. Conversely, when a sound is input from the phone receiver 32, the conversation control unit 73 receives the sound as audio data by way of the audio control unit 42. The audio data are transmitted to the conversation control unit 83.

In FIG. 10, a method for connecting the phone 90 of a callee to the network PBX 10, which will follow transmission of the audio data, is not disclosed. However, connecting the phone 90 of the callee to the network PBX 10 is the same as the method for connecting the slave terminal (phone) 30 to the network PBX 10.

However, there are two differences. One is that the network PBX 10 sends a communication start cue to the phone of the callee. Upon receipt of the communication start cue, the phone of the callee rings a bell and displays on the display unit 91 a screen for prompting the user to enter a password as in the case of the slave terminal (phone) 30. The cue does not correspond to SSL negotiations. The other difference is that SSL negotiations start soon when the user has entered his/her ID and password by means of the phone 90 of the callee. As a matter of course, a callee number is not necessary between the phone 90 of the callee and the network PBX 10. Accordingly, the user does not need to enter the callee number by means of the phone 90 of the callee.

As mentioned above, conversation between the slave terminal (the phone) 30 and the phone 90 of the callee becomes possible at a point in time when a series of operations performed between the slave terminal (phone) 30 and the network PBX 10 and between the phone 90 of the callee and the network PBX 10; namely, SSL negotiations, authentication, call control, and conversation control, are completed. Conversation control can also be performed when conversation between the slave terminal (the phone) 30 and the phone 90 of the callee has become possible.

A technique of distributing a client certificate to the slave terminal (the phone) 30 has hitherto been known as a method by means of which the network PBX 10 defends MITM attacks (fulfilling safe communication). However, the method encounters problems, such as high implementation costs and highly laborious management, for instance, an expire date. However, under the present method, implementation costs are low, and management is simple. Further, safety is not deteriorated.

When the slave terminal (phone) 30 is a cellular phone owned by an individual user, there is also yielded an advantage of prevention of unauthorized use of the slave terminal, which would otherwise arise when the cellular phone is lost (when the slave terminal is used, entry of a correct password is required. Further, the password is not stored in the cellular phone at all. Hence, even if an interior of the cellular phone is analyzed, safety will not be impaired.

Fifth Embodiment

Figure 11:
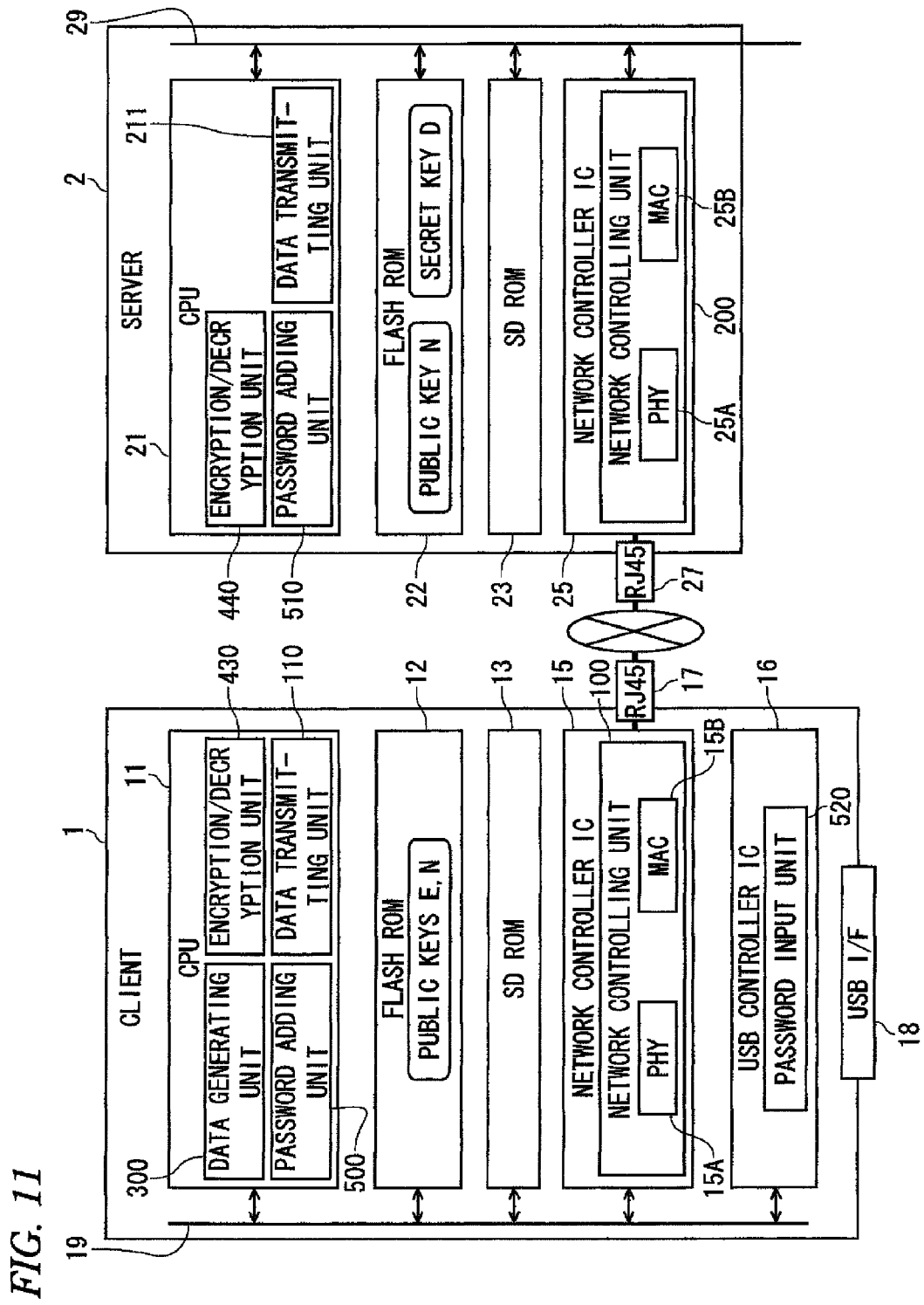
FIG. 11 is a hardware configuration diagram of a fifth embodiment of an encryption/decryption system.

FIG. 11 is a hardware configuration diagram of the encryption/decryption system. FIG. 11 can be applied to the first through fourth embodiments. The encryption/decryption system has the client 1 and the server 2. The client 1 and the server 2 are connected together by way of connectors (RJ45) 17 and 27 and by means of a network, such as the Internet.

In the client 1, a CPU 11, flash ROM 12, SD-ROM 13, a network controller IC (Integrated Circuit) 15, and a USB controller IC 16 are connected to a bus line 19. Each of them is made up of an integrated circuit. The CPU 11 has, as a functional block, the data generating unit 300, an encryption/decryption unit 430, a password adding unit 500, and the data transmitting unit 110. The flash ROM 12 stores the public keys E and N. The network controller IC 15 has the network controlling unit 100 as a functional block. The network controlling unit 100 is made up of a PHY (physical layer) block 15A and a MAC (a media access control layer) block 15B. A USB I/F 18 to which a Universal Serial Bus is connectable is connected to the USB controller IC 16.

In the server 2, a CPU 21, Flash ROM 22, SD-ROM 23, and a network controller IC (Integrated Circuit) 25 are connected to a bus line 29. Each of them is made up of an integrated circuit. The CPU 21 has, as a functional block, an encryption/decryption unit 440, the password subtracting unit 510, and the data receiving unit 211. The public key N and the secret key D are stored in the Flash ROM 22. The network controller IC 25 has, as a functional block, the network controlling unit 200. The network controlling unit 200 is made up of a PHY (physical layer) block 25A and a MAC (Media Access Control Layer) block 25B. A USB I/F to which a Universal Serial Bus is connectable is connected to the USB controller IC 16.

The present patent application is based on Japanese Patent Application (No. 2009-223991) filed on Sep. 29, 2009, the entire subject matter of which is incorporated herein by reference.

INDUSTRIAL APPLICABILITY

An encryption apparatus, a decryption apparatus, an encryption method, a decryption method, and an encryption/decryption system of the present invention make it possible to easily, lightly perform safe, secret communication eliminating intervention of the MITM in connection with public key encrypted communication, such as SSL encrypted communications, while using a password having a cryptographically weak, short bit length. Therefore, the apparatus and the method of the invention are useful.

REFERENCE SIGNS LIST

1: CLIENT
2: SERVER
100: NETWORK CONTROLLING UNIT
110: DATA TRANSMITTING UNIT
111: DATA RECEIVING UNIT
200: NETWORK CONTROLLING UNIT
211: DATA TRANSMITTING UNIT
300: DATA GENERATING UNIT
400: PUBLIC KEY ENCRYPTION/DECRYPTION UNIT A
410: PUBLIC KEY ENCRYPTION/DECRYPTION UNIT B
420: PUBLIC KEY ENCRYPTION/DECRYPTION UNIT A

The invention claimed is:
1. An encryption apparatus, comprising:
a receiver that receives a first public key from a decryption apparatus;
an encryptor that calculates a residue, as encryption data, by means of taking dividend data including at least a portion of a password added to or subtracted from a predetermined value as a dividend and the first public key as a divisor; and a transmitter that transmits the residue to the decryption apparatus.

2. The encryption apparatus according to claim 1, wherein the receiver receives a second public key, and the encryptor calculates the predetermined value while taking the second public key as an exponent of predetermined data.

3. The encryption apparatus according to claim 2, wherein the first public key and the second public key are public keys using RSA public-key cryptography.

4. The encryption apparatus according to claim 1, wherein the receiver receives a second public key, and the encryptor calculates the predetermined value while taking a random number as an exponent of the second public key.

5. The encryption apparatus according to claim 4, wherein the first public key and the second public key are public keys using El-Gamal encryption.

6. The encryption apparatus according to claim 1, further comprising a password input unit that receives the password.

7. The encryption apparatus according to claim 1, wherein the public key has a nature of a one-way function.

8. A decryption apparatus, comprising:

a receiver that receives encrypted data from an encryption apparatus; and a decryption unit that adds or subtracts at least a portion of a password to or from the encrypted data, thereby decrypting a calculation result with a secret key.

9. An encryption method, comprising:

receiving a first public key from an encryption apparatus;

calculating a residue, as encryption data by means of taking dividend data including at least a portion of a password added to or subtracted from a predetermined value as a dividend and the first public key as a divisor; and transmitting the residue to a decryption apparatus.

10. A decryption method, comprising:

receiving encrypted data from an encryption apparatus; and adding or subtracting at least a portion of the password to or from the encrypted data, thereby decrypting a calculation result with a secret key.

11. An encryption/decryption system, comprising:

an encryption apparatus that performs encryption processing; and a decryption apparatus that performs decryption processing, wherein the encryption apparatus includes:

a receiver that receives a public key from the decryption apparatus;

an encryptor that calculates a residue, as encryption data, by means of taking dividend data including at least a portion of a password added to or subtracted from a predetermined value as a dividend and the public key as a divisor; and a transmitter that transmits the residue to the decryption apparatus, and wherein the decryption apparatus includes:

a receiver that receives the encrypted data from the encryption apparatus; and a decryptor that adds or subtracts at least a portion of the password to or from the encrypted data, thereby decrypting a calculation result with a secret key.

* * * * *